(12) United States Patent
Liu et al.

(10) Patent No.: US 8,630,588 B2
(45) Date of Patent: Jan. 14, 2014

(54) EFFICIENT AND FLEXIBLE TRANSMIT BEAMFORMING SECTOR SWEEP IN A MULTI-ANTENNA COMMUNICATION DEVICE

(75) Inventors: Yong Liu, Santa Clara, CA (US);
Hongyuan Zhang, Fremont, CA (US);
Songping Wu, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 1103 days.

(21) Appl. No.: 12/605,978

(22) Filed: Oct. 26, 2009

(65) Prior Publication Data
US 2010/0103045 A1    Apr. 29, 2010

Related U.S. Application Data

(60) Provisional application No. 61/109,462, filed on Oct. 29, 2008.

(51) Int. Cl.
*H04B 1/00*    (2006.01)

(52) U.S. Cl.
USPC .......................... 455/63.1; 455/63.4; 370/338

(58) Field of Classification Search
USPC .......................... 455/509, 63.1, 63.4; 370/338
See application file for complete search history.

(56) References Cited

U.S. PATENT DOCUMENTS

| | | | |
|---|---|---|---|
| 7,627,348 B2 | 12/2009 | Lysejko et al. | |
| 2005/0068231 A1 | 3/2005 | Regnier et al. | |
| 2008/0261658 A1 | 10/2008 | Jin et al. | |
| 2009/0232106 A1 | 9/2009 | Cordeiro et al. | |

(Continued)

FOREIGN PATENT DOCUMENTS

| | | | |
|---|---|---|---|
| EP | 1912346 | * | 9/2006 |
| EP | 2 104 245 | | 9/2009 |

(Continued)

OTHER PUBLICATIONS

IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2009).

(Continued)

*Primary Examiner* — Nay A Maung
*Assistant Examiner* — Angelica M Perez

(57) ABSTRACT

A plurality of beacon data units are generated, and each beacon data unit in the plurality of beacon data units includes an indication that the beacon data unit can be used for transmit beamforming training. The plurality of beacon data units are transmitted via a plurality of antennas during a timeslot reserved for the transmission of beacons. A different beamforming vector is applied to a beamforming network as each beacon data unit is transmitted. In another aspect, a first beamforming training transmission corrupted by a collision is received. A first station to which the first beamforming training transmission corresponds is determined based on the first beamforming training transmission corrupted by the collision. In response to determining the first station, a signal is transmitted to the first station to prompt the first station to transmit a second beamforming training transmission.

15 Claims, 14 Drawing Sheets

(56) References Cited

U.S. PATENT DOCUMENTS

| | | | |
|---|---|---|---|
| 2010/0056062 A1 | | 3/2010 | Zhang et al. |
| 2010/0061271 A1* | | 3/2010 | Seyedi-Esfahani et al. .. 370/254 |
| 2010/0164802 A1 | | 7/2010 | Li et al. |
| 2010/0164805 A1 | | 7/2010 | Niu et al. |
| 2011/0045785 A1* | | 2/2011 | Sutskover et al. ............. 455/69 |

FOREIGN PATENT DOCUMENTS

| | | | |
|---|---|---|---|
| JP | 2007521708 | | 8/2007 |
| JP | 2008512954 | | 4/2008 |
| WO | WO 2005/062496 | * | 7/2005 |
| WO | WO-2005/062496 A1 | | 7/2005 |
| WO | WO-2006/031495 | | 3/2006 |
| WO | WO-2006/135653 A1 | | 12/2006 |
| WO | WO-2008/069245 | | 6/2008 |

OTHER PUBLICATIONS

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).
S. A. Mujtaba, "IEEE P802.11—Wireless LANS, TGn Sync Proposal Technical Specification," *The Institute of Electrical and Electronics Engineers, Inc.*, doc.: IEEE.802.11-04/0889r6, May 2005.
"IEEE 802.15.3™ Guide Addresses Untapped High-Rate Wireless Personal Area Network (WPAN) Market," *The Institute of Electrical and Electronics Engineers, Inc.*, available at http://standards.ieee.org/announcements/pr_802153wpanguide.html (2004).
International Preliminary Report on Patentability in corresponding PCT/US2009/062070 mailed May 3, 2011.
"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.
International Search Report and Written Opinion for PCT/US2009/062070, mailed Jun. 9, 2010, 15 pages.
"IEEE P802.11n™/D3.00, Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.
Lakkis et al., "IEEE802.15.3c Beamforming Overview," Tensorcom, available at https://mentor.ieee.org/802.11/dcn/09/11-09-0355-01-00ad-tg3c-beamforming-overview.pdf, doc.: IEEE 802.11-09/0355r0, Mar. 2009.
U.S. Appl. No. 12/548,393, filed Aug. 26, 2009, Zhang et al.
U.S. Appl. No. 61/091,914, filed Aug. 26, 2008, Zhang et al.
Notice of Reasons for Rejection in JP Application No. 2011-534661 dated Sep. 25, 2012.

* cited by examiner

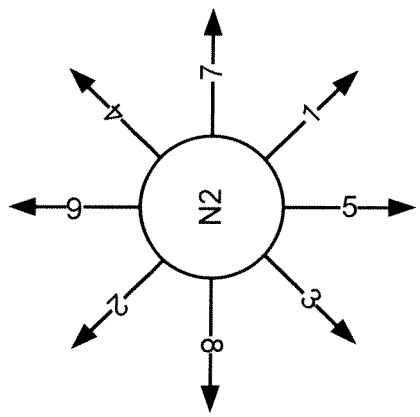
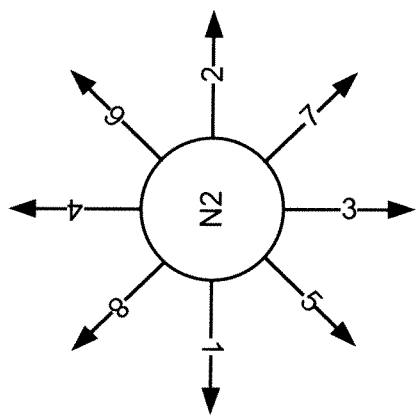
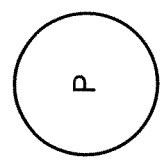
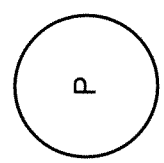
FIG. 9A
FIG. 9B
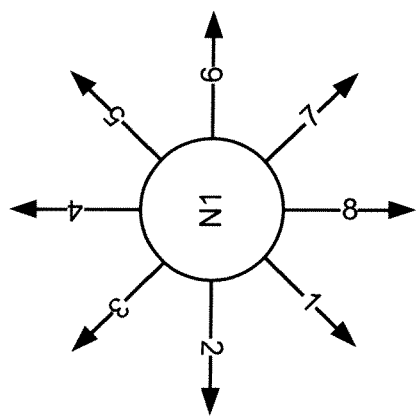
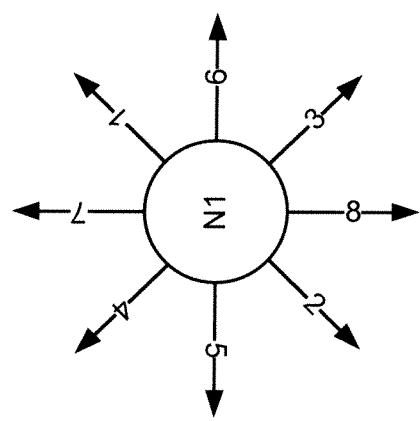

EFFICIENT AND FLEXIBLE TRANSMIT BEAMFORMING SECTOR SWEEP IN A MULTI-ANTENNA COMMUNICATION DEVICE

CROSS REFERENCE TO RELATED APPLICATION

This application claims the benefit of U.S. Provisional Patent App. No. 61/109,462 entitled "Efficient and Flexible TX Sector Sweep," filed Oct. 29, 2008, the disclosure of which is hereby expressly incorporated herein by reference.

FIELD OF TECHNOLOGY

The present disclosure relates generally to communication systems in which multiple devices transmit and receive data using multiple antennas and, more particularly, to beamforming in such communication systems.

BACKGROUND

An ever-increasing number of relatively inexpensive, low power wireless data communication services, networks and devices have been made available over the past number of years, promising near wire speed transmission and reliability. Various wireless technology is described in detail in the 802 IEEE Standards, including for example, the IEEE Standard 802.11a (1999) and its updates and amendments, the IEEE Standard 802.11n, and the IEEE draft standards 802.15.3, and 802.15.3c now in the process of being finalized, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a or the IEEE draft standard 802.11n. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

In general, antennas and, accordingly, associated effective wireless channels are highly directional at frequencies near or above 60 GHz. When multiple antennas are available at a transmitter, a receiver, or both, it is therefore important to apply efficient beam patterns using the antennas to better exploit spatial selectivity of the corresponding wireless channel. Generally speaking, beamforming or beamsteering creates a spatial gain pattern having one or more high gain lobes or beams (as compared to the gain obtained by an omnidirectional antenna) in one or more particular directions, with reduced the gain in other directions. If the gain pattern for multiple transmit antennas, for example, is configured to produce a high gain lobe in the direction of a receiver, better transmission reliability can be obtained over that obtained with an omni-directional transmission.

U.S. patent application Ser. No. 12/548,393, filed on Aug. 26, 2009, and entitled "Beamforming by Sector Sweeping," and U.S. Provisional Patent Application No. 61/091,914 entitled "Beamforming by Sector Sweeping," filed Aug. 26, 2008, are both expressly incorporated by reference herein in their entireties. These applications generally describe a beamforming technique referred to as "beamforming by sector sweeping." In one implementation of beamforming by sector sweeping for determining a transmit beamforming pattern to be applied by a first device when transmitting data to a second device, the first device transmits a plurality of training packets to the second device, where the first device applies a different beamforming pattern when transmitting each training packet. The second device generally determines which of the training packets had the highest quality (e.g., had the highest signal-to-noise ration (SNR), the lowest bit error rate (BER), etc.) and notifies the first device. The first device can then utilize the transmit beamforming pattern that yielded the highest quality packet. Similarly, to determine a receive beamforming pattern to be applied by the first device when receiving data from the second device, the second device transmits a plurality of training packets to the first device, and the first device applies a different beamforming pattern when receiving each training packet. The first device generally determines which of the training packets had the highest quality, and can then utilize the receive beamforming pattern that yielded the highest quality packet.

If there are multiple devices trying to perform beamforming training with a same device (e.g., a central point device), some training packets transmitted from the multiple devices to the central point device may collide. Such collisions can lead to delays in the beamforming training process.

SUMMARY

In one embodiment, a method comprises generating a plurality of beacon data units, wherein each beacon data unit in the plurality of beacon data units includes an indication that the beacon data unit can be used for transmit beamforming training, and transmitting the plurality of beacon data units via a plurality of antennas during a timeslot reserved for the transmission of beacons. Transmitting the plurality of beacon data units includes applying a different beamforming vector to a beamforming network as each beacon data unit is transmitted.

In other embodiments, the method may comprise one or more of the following. The indication that the beacon data unit can be used for transmit beamforming training may comprise an information element that includes a number of beam refinement training sequences. The information element may include an indication of a limit to a number of beamforming training data units that can be sent in a reverse direction. The indication that the beacon data unit can be used for transmit beamforming training may comprise an information element or an information field that includes a value indicating a position of a beamforming training data unit in a sequence of beamforming training data units or a number of beamforming training units to follow a beamforming training data unit. The indication that the beacon data unit can be used for transmit beamforming training may comprise a field to indicate a request for beamforming training feedback, or may comprise an information element that includes such a field. The indication that the beacon data unit can be used for transmit beamforming training may comprise a field having one or more subsequent beam refinement parameters, or may comprise an information element that includes such a field. The indication that the beacon data unit can be used for transmit beamforming training may comprise a field indicating a limit to a number of transmit or receive beamforming training data units that can be sent in a reverse direction, or may comprise an information element that includes such a field.

The method may further comprises receiving an indication from a station that transmit beamforming training data units should not be transmitted to the station, and skipping a transmit beamforming training sequence with the station in response to receiving the indication from the station.

The indication from the station that transmit beamforming training data units should not be transmitted may be received in a timeslot reserved for beamforming training with stations not yet beamformed.

In another embodiment, an apparatus comprises a transceiver coupled to a plurality of antennas, the transceiver including a beamforming network, and a controller. The controller is configured to generate a plurality of beacon data units, wherein each beacon data unit in the plurality of beacon data units includes an indication that the beacon data unit can be used for transmit beamforming training. The controller is also configured to cause the transceiver to transmit the plurality of beacon data units via the plurality of antennas during a timeslot reserved for the transmission of beacons, and cause a different beamforming vector to be applied to the beamforming network as each beacon data unit is transmitted.

In other embodiments, the apparatus may comprise one or more of the following. The indication that the beacon data unit can be used for transmit beamforming training may comprise an information element that includes a number of beam refinement training sequences. The information element may include an indication of a limit to a number of beamforming training data units that can be sent in a reverse direction. The indication that the beacon data unit can be used for transmit beamforming training may comprise a respective value indicating a position of a respective beamforming training data unit in a sequence of the plurality of beamforming training data units or a number of beamforming training units in the plurality of beamforming data units to follow the respective beamforming training data unit. The indication that the beacon data unit can be used for transmit beamforming training may comprise a field to indicate a request for beamforming training feedback, or may comprise an information element that includes such a field. The indication that the beacon data unit can be used for transmit beamforming training may comprise a field having one or more subsequent beam refinement parameters, or may comprise an information element that includes such a field. The indication that the beacon data unit can be used for transmit beamforming training may comprise a field indicating a limit to a number of transmit or receive beamforming training data units that can be sent in a reverse direction, or may comprise an information element that includes such a field.

The controller may be configured to skip a transmit beamforming training sequence with a station, in response to receiving an indication from the station that transmit beamforming training data units should not be transmitted to the station. The indication from the station that transmit beamforming training data units should not be transmitted may be received in a timeslot reserved for beamforming training with stations not yet beamformed.

In yet another embodiment, a method comprises receiving at a station a plurality of transmit beamforming training data units transmitted by a network controller during a timeslot reserved for transmission of beacons or transmitted by the network controller to another station, and transmitting to the network controller an indication that transmit beamforming training data units should not be transmitted to the station in response to receiving the plurality of transmit beamforming training data units.

In other embodiments, the method may comprise one or more of the following. The plurality of transmit beamforming training data units may be beacon data units, and each of the beacon data units may include an indication that the beacon data unit can be used for transmit beamforming training. The indication that the beacon data unit can be used for transmit beamforming training may comprise an information element that includes a number of beam refinement training sequences. The information element may include an indication of a limit to a number of beamforming training data units that can be sent to the network controller.

In still another embodiment, an apparatus comprises a transceiver and a controller. The controller is configured to detect a plurality of transmit beamforming training data units transmitted by a network controller during a timeslot reserved for transmission of beacons or transmitted by the network controller to another station separate from the apparatus. The controller is also configured to cause the transceiver to transmit to the network controller an indication that transmit beamforming training data units should not be transmitted to the apparatus in response to receiving the plurality of transmit beamforming training data units.

In other embodiments, the apparatus may comprise one or more of the following. The plurality of transmit beamforming training data units may be beacon data units, and each of the beacon data units may include an indication that the beacon data unit can be used for transmit beamforming training. The indication that the beacon data unit can be used for transmit beamforming training may comprise an information element that includes a number of beam refinement training sequences. The information element may include an indication of a limit to a number of beamforming training data units that can be sent to the network controller.

The indication that transmit beamforming training data units should not be transmitted to the apparatus may be transmitted in a timeslot reserved for beamforming training with stations not yet beamformed.

The transceiver may be coupled to a plurality of antennas and the transceiver may comprise a beamforming network. The controller may be configured to generate an additional plurality of beamforming training data units. The controller may be configured to cause the transceiver to transmit the additional plurality of beamforming training data units to the network controller via the plurality of antennas. The controller may be configured to cause a different beamforming vector to be applied to the beamforming network as each beamforming data unit in the additional plurality of beamforming training data units is transmitted.

In yet another embodiment, a method comprises receiving a first beamforming training transmission corrupted by a collision, and determining a first station to which the first beamforming training transmission corresponds based on the first beamforming training transmission corrupted by the collision. The method also comprises in response to determining the first station, transmitting a signal to the first station to prompt the first station to transmit a second beamforming training transmission.

In other embodiments, the method may comprise one or more of the following. The method may comprise receiving a third beamforming training transmission corrupted by the collision, determining a second station to which the third beamforming training transmission corresponds based on the third beamforming training transmission corrupted by the collision, and transmitting a signal to the second station to prompt the second station to transmit a fourth beamforming training transmission in response to determining the second station.

Determining the first station may include recovering a source address from the first beamforming training transmission.

The method may comprise determining a time at which the first station should transmit the second beamforming training transmission in response to deter fining the first station, wherein the signal to the first station to prompt the first station to transmit the second beamforming training transmission includes an indicator of the time.

The time may be in a time period reserved for stations to perform beamforming training.

The first beamforming training transmission may be received by a central station during a first time frame in a plurality of time frames, wherein the central station may transmit beacons during respective beacon intervals in the plurality of time frames, and wherein the signal to the first station to prompt the first station to transmit the second beamforming training transmission may be transmitted during a beacon interval of a second time frame following the first time frame.

The first beamforming training transmission may be received by a central station during a first time frame in a plurality of time frames, and wherein the central station may transmit beacons during respective beacon intervals in the plurality of time frames. The signal to the first station to prompt the first station to transmit the second beamforming training transmission may be transmitted during the first time frame and outside of a beacon interval of the first time frame.

In still another embodiment, an apparatus comprises a transceiver coupled to a plurality of antennas. The apparatus also comprises a controller configured to determine a first station to which a first beamforming training transmission corresponds based on the first beamforming training transmission, wherein the first beamforming training transmission is corrupted by a collision. The controller is also configured to cause the transceiver to transmit a signal to the first station to prompt the first station to transmit a second beamforming training transmission in response to determining the first station.

In other embodiments, the apparatus may comprise one or more of the following. The controller may be configured to determine a second station to which a third beamforming training transmission corresponds based on third first beamforming training transmission, wherein the third beamforming training transmission is corrupted by the collision, and cause the transceiver to transmit a signal to the second station to prompt the second station to transmit a fourth beamforming training transmission in response to determining the second station.

The controller may be configured to determine a time at which the first station should transmit the second beamforming training transmission in response to determining the first station, wherein the signal to the first station to prompt the first station to transmit the second beamforming training transmission includes an indicator of the time.

The time may be in a time period reserved for stations considered to be new to a network. The time may be in a time period reserved for stations considered to be already known to a network.

The first beamforming training transmission may be received during a first time frame in a plurality of time frames, and wherein the controller may cause the transceiver to transmit beacons during respective beacon intervals in the plurality of time frames. Additionally, the controller may cause the transceiver to transmit, during a beacon interval of a second time frame following the first time frame, the signal to the first station to prompt the first station to transmit the second beamforming training transmission.

The first beamforming training transmission may be received during a first time frame in a plurality of time frames, and the controller may cause the transceiver to transmit beacons during respective beacon intervals in the plurality of time frames. Additionally, the controller may cause the transceiver to transmit, during the first time frame and outside of a beacon interval of the first time frame, the signal to the first station to prompt the first station to transmit the second beamforming training transmission.

BRIEF DESCRIPTION OF THE DRAWINGS

FIG. 9A is a block diagram a communication network in which one station performs transmit beamforming sector sweeping in a sequential fashion with respect to direction and another station performs transmit beamforming sector sweeping in a randomized order with respect to direction.

FIG. 9B is a block diagram a communication network in which two stations perform transmit beamforming sector sweeping in randomized orders with respect to direction.

DETAILED DESCRIPTION

Example methods and apparatus for removing redundant beamforming training transmissions and/or reducing delays due to beamforming training are discussed in detail below. First, however, a brief overview of example methods and apparatus for performing beamforming training in general will be described as background.

Overview of Beamforming Training

Figure 1A:
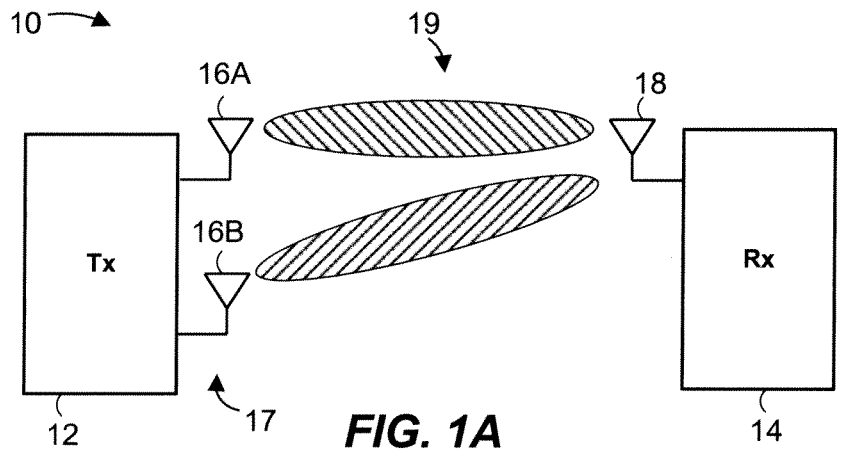
FIG. 1A is a block diagram of a communication system including a transmitter having multiple antennas and a receiver having a single antenna.
Figure 1B:
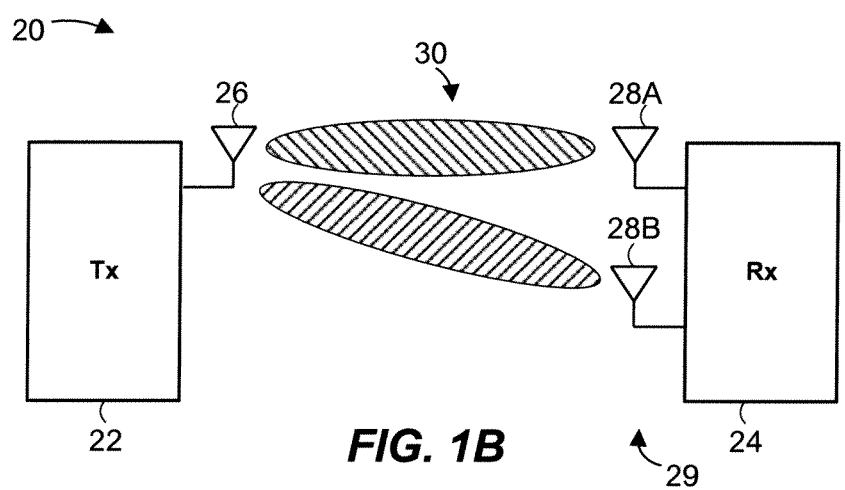
FIG. 1B is a block diagram of a communication system including a transmitter having a single antenna and a receiver having multiple antennas.
Figure 1C:
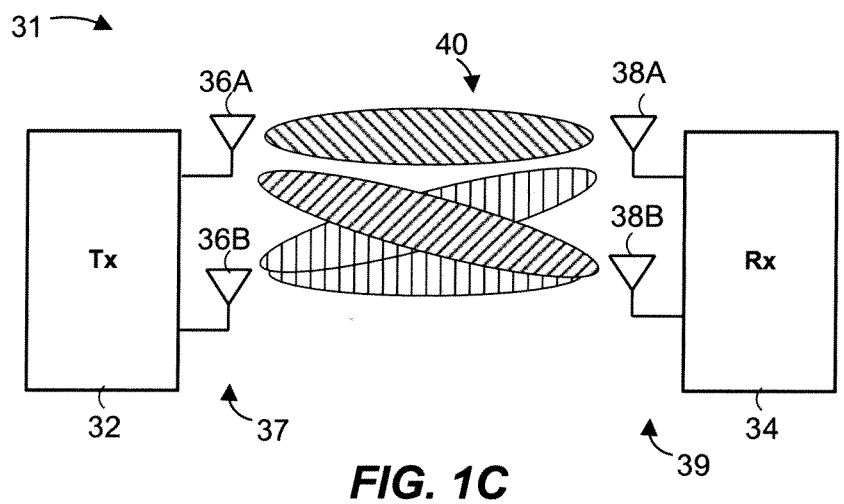
FIG. 1C is a block diagram of a communication system including a transmitter having multiple antennas and a receiver having multiple antennas.

FIGS. 1A-1C are block diagrams of several examples of communication systems that may use a technique referred to herein as beamforming sector sweeping to identify efficient gain patterns for transmitting and receiving data via wireless channels. For simplicity, FIGS. 1A-1C illustrate systems in which only two devices are communicating with each other. However, as described further below, a system may also include more than two devices, and one device may communicate with several other devices. In any event, FIG. 1A illustrates a wireless communication system 10 in which a station or transmitting device 12 transmits information over a wireless communication channel to another station or receiving device 14. In general, the transmitted information may be in the form of one or more data units (e.g. packets, frames, etc). Each of the devices 12 and 14 may be a base station or a mobile station, for example. In the example of FIG. 1A, the transmitting device 12 is equipped with two or more antennas 16 defining an antenna array 17, while the receiving device 14 is equipped with a single antenna 18. The wireless communication system 10 is thus a multiple input, single output (MISO) system. For the purposes of simplicity and conciseness, the transmitting device 12 is illustrated with only two antennas 16A and 16B. However, it will be noted that the transmitting device 12 may generally have any desired number of antennas.

During transmission, in one implementation, the transmitting device 12 controls the phase and/or amplitude of a signal at each of the antennas 16A and 16B to define a radiation or gain pattern 19. Specifically with respect to controlling phases, the transmitting device 12 selects a steering vector (or "phasor") that specifies a set of phase shifting angles, and applies the steering vector to the antenna array 17 to thereby define a phased antenna array. The steering vector may specify a 0° phase shift for the antenna 16A and a 35° phase shift for the antenna 16B, for example. In this manner, the steering vector defines a direction of transmission or reception of the antenna array 17 that may be referred to as a "sector."

Similarly, a wireless communication system 20 (see FIG. 1B) is a single input, multiple output (SIMO) system that includes a station or transmitter 22 and a station or receiver 24, with the transmitter 22 having a single antenna 26 and the receiver 24 having multiple antennas 28 arranged in an antenna array 29. The transmitter 22 transmits a signal to the receiver 24 via the single antenna 26, and the receiver can define a gain pattern 30 by controlling phase shifting angles at the antennas 28A-28B using a corresponding steering vector.

Meanwhile, a wireless communication system 31 illustrated in FIG. 1C is a multiple input, multiple output (MIMO) system in which each of a station or transmitter 32 and a station or receiver 34 is equipped with multiple antennas (36A-36B defining an antenna array 37 and 38A-38B defining an antenna array 39, respectively). Each of the transmitter 32 and the receiver 34 can apply steering vectors to the respective antenna array 36 or 38 to define gain patterns 40.

A station equipped with multiple antennas and operating in a MIMO environment (or in one of degenerate forms of MIMO such as SIMO or MISO) can use a transmit steering vector $u_{TX}$ to define a gain pattern when transmitting outbound data and a receive steering vector $u_{RX}$ to define a gain pattern when receiving inbound data. By extension, when a pair of multi-antenna devices (e.g., devices 32 and 34) exchange data in both directions, these devices may define steering vectors $u_{TX}^1$, $u_{RX}^1$, $u_{TX}^2$, and $u_{RX}^2$. Further, an antenna array can sometimes operate in an omni receive pattern mode or quasi-omni receive pattern mode (i.e., closely approximating the omni mode) $omni_{RX}$ in which the antenna array does not reinforce or suppress power of signals from any particular direction, or in an omni or quasi-omni transmit pattern mode $omni_{TX}$ in which the antenna array does not reinforce or suppress power of transmitted signals in any particular direction. For the purposes of conciseness, both omni and quasi-omni modes are referred to as "omni" modes below.

In general, any pair of communicating stations in which at least one of the stations has multiple antennas can implement beamforming by sector sweeping as discussed herein. One example of beamforming by sector sweeping in will be described with reference to FIG. 1C. To identify an efficient (or, at least, a relatively good) transmit steering vector $u_{TX}$, the multi-antenna station 32 can iteratively apply a series of transmit steering vectors $u_1, u_2, \ldots u_n$ to the antenna array 37 and transmit training data units (e.g., packets, frames, etc.) $d_1, d_2, \ldots d_n$, using the antenna array 37 and using respective transmit steering vectors $u_1, u_2, \ldots u_n$. In this sense, each of the transmit steering vectors $u_1, u_2, \ldots u_n$ corresponds to one of the training data units $d_1, d_2, \ldots d_n$, (e.g., $u_1$ corresponds to $d_1$, $u_2$ corresponds to $d_2$, etc.). The station 34 can assess the quality of each received data unit $d_1, d_2, \ldots d_n$ using any desired technique, although the station 34 may not receive all of the data units $d_1, d_2, \ldots d_n$ and thus may not determine a quality metric for each of the data units $d_1, d_2, \ldots d_n$. In one implementation, the station 34 receives the training data units $d_1, d_2, \ldots d_n$ using the same receive steering vector (or an omni or quasi-omni transmit pattern mode, a single antenna, etc.) and assesses the quality of received data units $d_1, d_2, \ldots d_n$. The station 34 can transmit to the station 32 indications of quality of at least some the received data units (i.e., quality metrics for all of the data units received by the station 34 or quality metrics corresponding to some subset of the data units received by the station 34, such as the three data units of the highest quality). The station 32 can then select a transmit steering vector $u_{TX}$ from or based on the set of steering vectors $u_1, u_2, \ldots u_n$ based on the relative quality of the data units received by the station 34. Alternatively, the station 34 can select a transmit steering vector $u_{TX}$ from or based on the set of steering vectors $u_1, u_2, \ldots u_n$ based on the relative quality of the data units received by the station 34, and can then transmit the selected steering vector or an indication of the selected steering vector to the station 32. In this manner, the station 32 performs transmit beamforming by conducting a sector sweep.

In some embodiments, the transmit steering vector $u_{TX}$ need not precisely match any of the steering vectors $u_1, u_2, \ldots u_n$, and the station 32 (or the station 34) can use the quality metrics associated with the received sequence of data units $d_1, d_2, \ldots d_n$, to extrapolate the desired transmit steering vector $u_{TX}$. In other embodiments, the station 32 (or the station 34) can average several steering vectors u (e.g., top two, top three, etc.) to determine the transmit steering vector $u_{TX}$, and this technique may be referred to as beam refining. In general, it is possible to apply any suitable algorithm to generate the transmit steering vector $u_{TX}$ based on the assessed quality of received data units corresponding to the set $u_1, u_2, \ldots u_n$ (or a subset thereof).

The station 34 can use any desired technique to assess the quality of a received training data unit d. For example, the station 34 can measure the strength of the received signal, calculate the signal-to-noise ratio (SNR) of the signal associated with the training data unit d, assess the bit error rate (BER) of the data in the data unit d, etc. In general, the beamforming techniques discussed herein can be used with any methodology for measuring the quality of wireless reception.

In some embodiments, the station 32 transmits the training data units $d_1, d_2, \ldots d_n$ using the most reliable modulation and coding scheme (MCS) set available to the stations 32 and 34. In other words, the station 32 can select the slowest data rate and, in some cases, the longest preamble defined by the wireless standard supported by the stations 32 and 34 (e.g., IEEE draft standard 802.15). The stations 32 and 34 may thus increase the probability that the training data unit d successfully propagates from the station 32 to the station 34. However, the beamforming techniques discussed herein do not require any particular modulation scheme or coding rate.

In one implementation, the stations 32 and 34 can perform transmit beamforming in the same timeslot in which the station 32 sends a request message to the station 34 requesting to perform transmit beamforming. In the specific context of WPAN, for example, the timeslot during which such a request is sent and transmit beamforming occurs is referred to as a Channel Allocation Timeslot ("CTA"). Alternatively, the station 32 can transmit a request to perform transmit beamforming to a network controller (e.g., a piconet central point (PCP)), and in response the network controller can allocate one or several timeslots during which a specified number of training units may be sent, and the network controller can communicate the scheduling information to the stations 32 and 34. Additionally or alternatively, the network controller can schedule transmit beamforming in one or both directions (i.e., transmit beamforming at station 32 and transmit beamforming at station 34).

Figure 2:
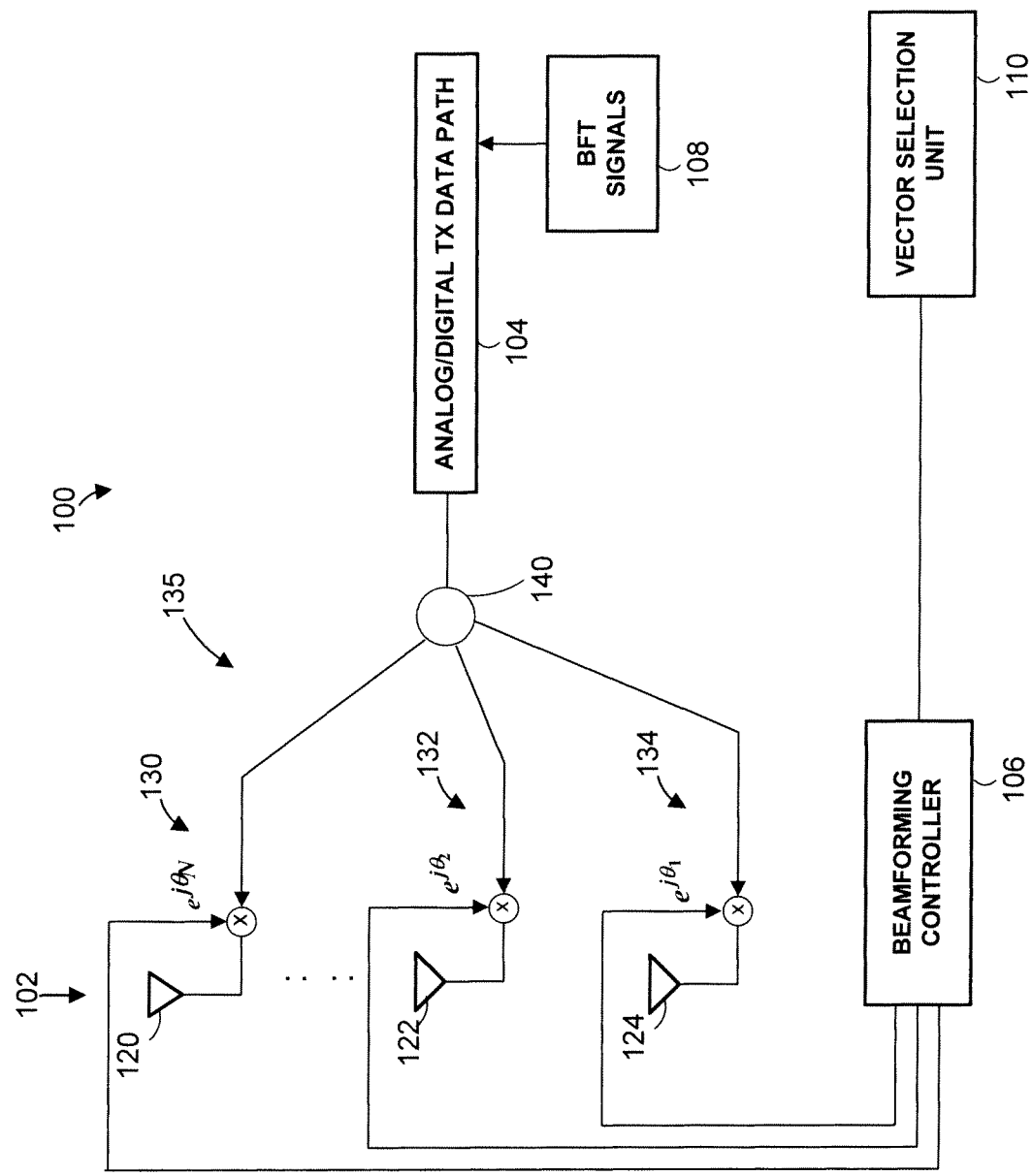
FIG. 2 is a block diagram of an example transmitter configured to select and apply a transmit steering vector based on sector sweeping.

Next, FIG. 2 is a block diagram of an example transmitter architecture of a station 100 that includes an antenna array 102, an analog/digital transmitter data path 104, a beamforming controller 106, a memory 108 to store beamforming training (BFT) signals, and a vector selection unit 110. The antenna array 102 has n antennas including antennas 120, 122, and 124 coupled to respective delay lines 130, 132, and 134, which may be digitally controllable and which define a beamforming network 135. Each of the delay lines 130, 132, and 134 can shift the signal transmitted from the corresponding antenna 120, 122, or 124 by a phase shifting angle θ. Together, the antenna array 102 and the delay lines 130, 132, and 134 define a phased array of the station 100. During a transmit beamforming procedure, the beamforming controller 106 can iteratively step through a sequence of steering vectors $u_1, u_2, \ldots u_n$ as discussed above, and apply the phase shifting angles $\theta_1, \theta_2, \ldots \theta_n$ to the digitally controllable delay lines 130, 132, and 134 according to a current value of the vector u.

The antennas 120-124 may share a common analog/digital transmit data path to reduce the implementation cost of the station 100. To this end, a splitter 140 may use any suitable technique to apply one signal from the transmit data path 104 to the antennas 120-124, shifted by the corresponding angles $\theta_1, \theta_2, \ldots \theta_n$. In other embodiments, each of the antennas 120-124 and the corresponding delay line 130-134 may be coupled to a separate data path. As is generally known, the analog/digital transmit data path 104 may include some or all of such components as an encoder, an interleaver, a modulator, a digital to analog converter (DAC), an inverse Fast Fourier Transform (IFFT) processing block, etc.

As discussed above, the transmitter 100 may receive from another station quality indicator(s) corresponding to at least some of the BFT training signals transmitted by the transmitter 100. In another implementation, the transmitter 100 may receive an indicator of a steering vector to be applied. The vector selection unit 110 may then utilize the quality indicator(s) or the steering vector indicator to select a steering vector.

The beamforming controller 106 then applies the selected steering vector to the antenna array 135.

In other implementations with multiple transmit data paths, a steering matrix may be utilized (a steering vector may be viewed as one type of a steering matrix), and the vector selection unit 110 may be termed a matrix selection unit 110 that selects a steering matrix based on feedback from another station corresponding to the transmitted transmit beamforming training data units. The transmitter 100 can include a beamsteering unit that applies the selected beamsteering matrix to the signals from the multiple transmit data paths. The beamforming controller 106 controls which beamsteering matrix is applied.

Generally with respect to the receiver architecture illustrated in FIG. 2, various ones of the modules 104, 106, 108, 110 may be implemented using hardware, software instructions executed by a processor, finny/are, or combinations thereof. Moreover, some of the components 104, 106, 108, 110 may be custom integrated circuits, application-specific integration circuits (ASICs), etc., communicatively coupled by electrical busses, for example. Further, the delay lines 130-134 may be digitally or analog controllable.

Figure 3:
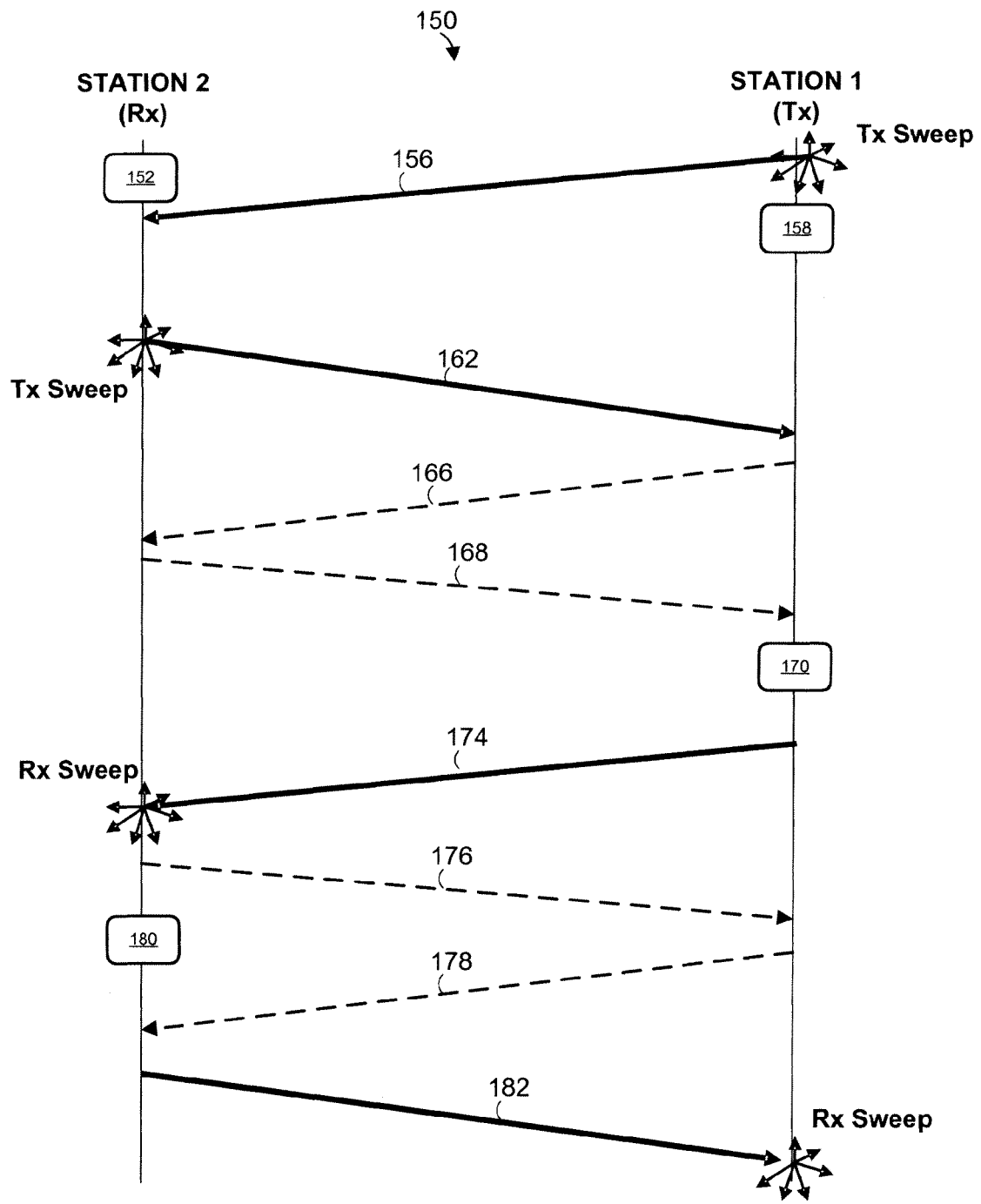
FIG. 3 is a message sequence chart that illustrates an example of information exchanges between stations to implement steering vector selection based on sector sweeping.
Figure 4:
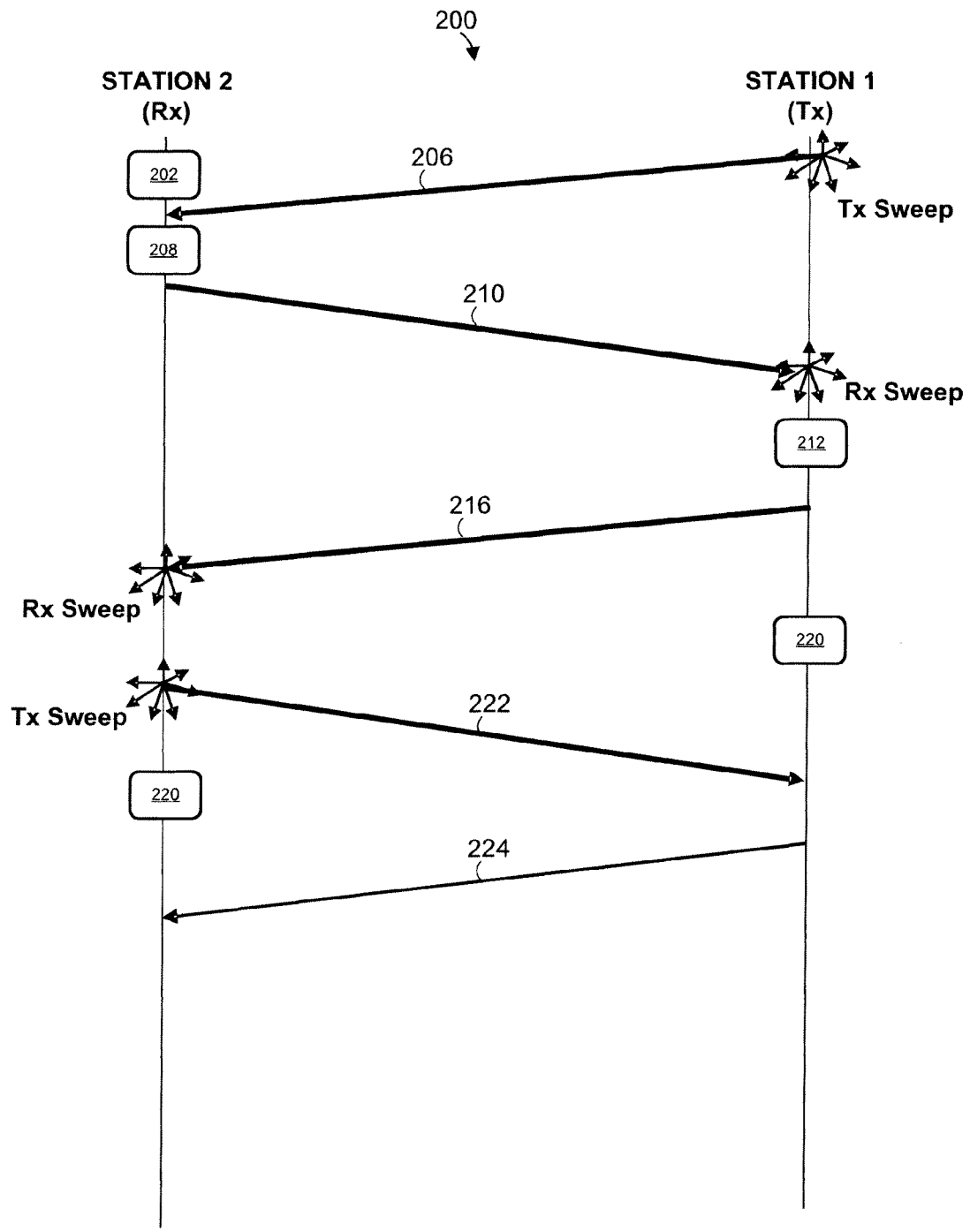
FIGS. 4 and 5 are message sequence charts that illustrate other examples of information exchanges between stations to implement steering vector selection based on sector sweeping.
Figure 5:
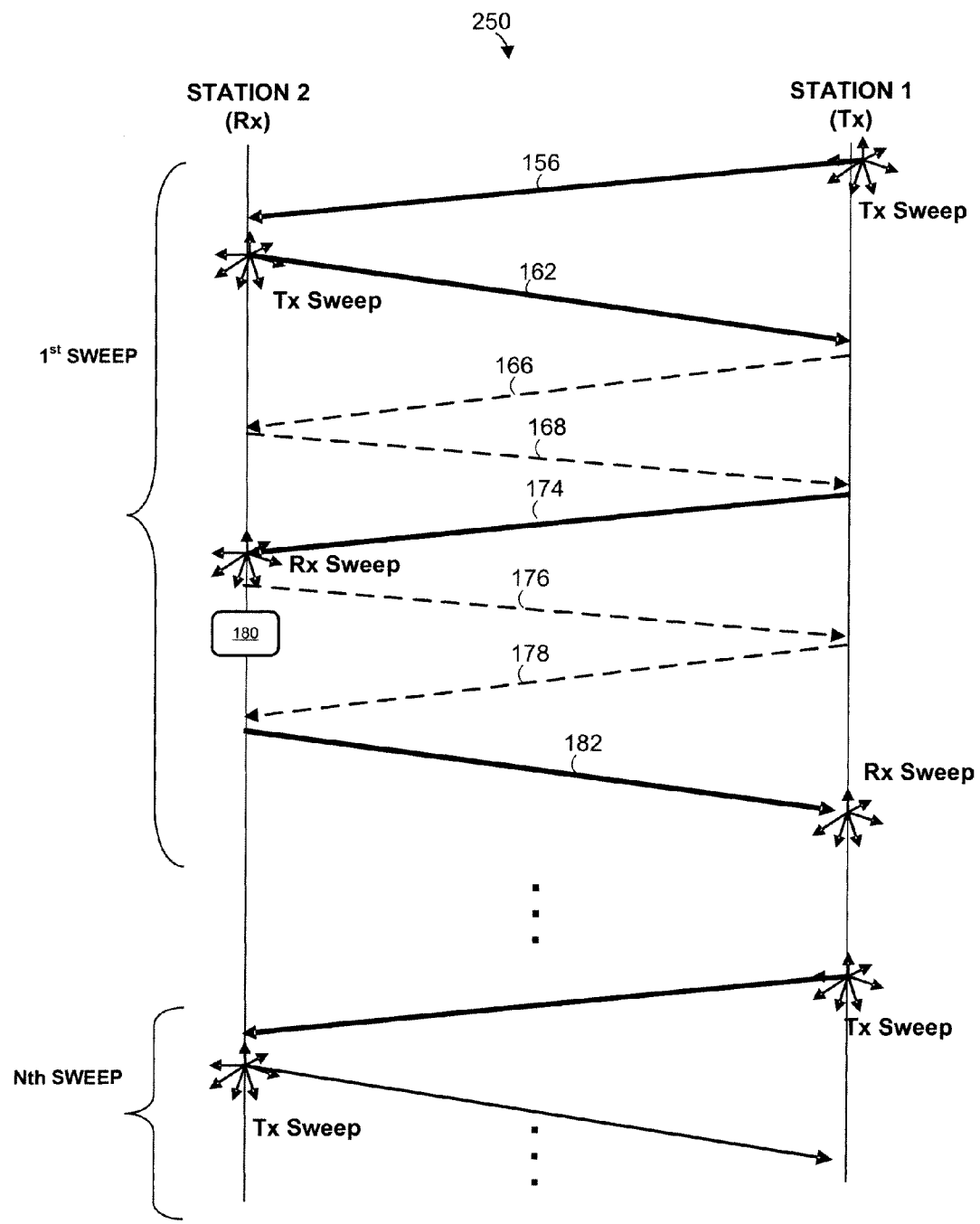

Next, FIGS. 3-5 are message sequence diagrams corresponding to several example methods that a pair of communicating devices (e.g., 12 and 14 of FIG. 1A, 22 and 24 of FIG. 1B, or 32 and 34 of FIG. 1C) can utilize, to support the beamforming techniques discussed above with reference to FIGS. 2 and 3. The methods discussed with reference to FIGS. 3-5 can be implemented as general beamforming protocols for WPAN, WLAN, and other types of networks. In this regard, it will be noted that some of the messages or steps of these methods can be omitted depending on the availability of multiple antennas at each of the pair of communicating devices, desired level of robustness, computational complexity, channel symmetry, etc.

FIG. 3 illustrates an example method 150 for a joint bidirectional transmit (Tx) and receive (Rx) sector sweeping. If implemented by a pair of multi-antenna devices 32 and 34, for example, station 2 with a timeline illustrated on the left may correspond to the device 34, and station 1 with a timeline illustrated on the right may correspond to the device 32. However, it will be understood that the terms "transmitter"/ "transmitting device" and "receiver"/"receiving device" merely refer to operational states of physical devices and are not intended to always limit these devices to only receiving or transmitting in the respective communication network. For example, the device 34 in FIG. 1C can operate as a transmitter and the device 32 can operate as a receiver at some point during operation.

In state 152, station 2 may set its antenna array to an omni receive pattern mode $omni_{RX}$ in preparation for a Tx beamforming by sector sweeping procedure that station 1 initiates to determine a transmit steering vector $u_{TX}^1$. As discussed above and described in greater detail below, stations 1 and 2 may have negotiated the timeslot for the Tx beamforming procedure in advance or, as another example, a network controller may have allocated one or several timeslots for some or all of the message exchanges of the method 150. Station 1 transmits a sequence 156 of training data units which can be similar to the data units $d_1, d_2, \ldots d_n$ discussed above. The sequence 156 can include data units of equal size spaced apart at equal intervals and having an identifier such as a sequence number, for example. Station 1 utilizes a different steering vector u for transmitting each training data unit in the sequence 156. Each training data unit in the sequence 156 can include an information element (IE) that identifies a request to initiate an Rx sweep procedure at station 1 and specifies a number of training data units to be transmitted during the procedure.

Next, station 1 can set its antenna array to an omni receive pattern mode in state 158. Also, station 2 can initiate a Tx beamforming sector sweep procedure by sending a sequence 162 of training data units (while iteratively switching the steering vector u) that include an IE specifying the feedback to the Tx sector sweeping procedure of station 1 (e.g., an identifier of a best received data unit), as well as an additional IE that indicates an Rx sector sweep request at station 2, possibly specifying a number of desired training data units in the requested Rx sector sweep procedure.

In other embodiments, the IE's in the sequence 162 specifying the feedback to the Tx sector sweeping procedure of station 1 can include more than one identifier 0. For example, station 2 may report the identifiers of "top three" data units received as a part of the sequence 156, the best and the worst received data units to allow station 1 to assess the spread in transmit quality, identifiers of all received data units along with the corresponding quality metrics, or any other desired report related to the sequence 156. In one embodiment, station 2 determines a transmit steering vector and includes an indication of the steering vector in the sequence 162.

Upon processing the sequence 162, station 1 can respond to station 2 with a feedback message 166 including feedback information for the Tx beamforming sector sweeping procedure at station 2. Station 1 can also select and apply the transmit steering vector indicated by the feedback IE sent during the sequence 162 to its antenna array. Additionally, the feedback message 166 can include an IE indicating a confirmation to the Rx sweep request from station 2. The confirmation IE may specify the number of training data units station 1 is planning to send to station 2. In one implementation, the number in the confirmation IE should match the number in the data units sent in the sequence 162. In this manner, station 2 receives an explicit acknowledgement to the Rx sweep request, and can further rely on the feedback message 166 to synchronize the timing of subsequent Rx sector sweep training data units.

Upon processing the feedback message 166, station 2 can reply with a similar feedback message 168 to synchronize with the Rx sweep request from station 1. However, it will be noted that messages 166 and 168 are optional.

In state 170, station 1 applies the selected Tx transmit steering vector to its antenna array and transmit a series 174 of training data units. Station 2 utilizes a different steering vector for receiving each training data unit in the series 174, and station 2 chooses a receive steering vector based on measured quality of each received training data unit in the series 174. Similar to the optional messages 166 and 168, stations 1 and 2 can exchange optional messages 176 and 178 to confirm the number of packets station 1 will send to station 2 (message 176) and acknowledge that station 1 is ready to receive training data units as a part of the Rx sector sweep procedure at station 1 (message 178). As indicated above, these optional messages allow stations 1 and 2 to synchronize in preparation for a sector sweeping procedure. This synchronization can be useful when switching from a transmit mode to a receive mode, for example, is relatively time-consuming, or when there is a risk of a clock drift at station 1 or station 2. Further, if stations 1 and 2 do not use messages 166 and 168 or 176 and 178, the Tx/Rx and Rx/Tx turnaround times (i.e., the time it takes a station to switch between transmit and receive modes) may need to be fixed at both stations 1 and 2, as well made known to the respective other station.

In another embodiment, the message 166 can additionally include an Rx sector sweep request from station 1. In this case, the message 168 can accordingly include a confirmation to the Rx sector sweep request, while the sequence 176 need not include an Rx sector sweep request. In one implementation, this will effectively reduce the number of data units that specify the Rx sector sweep request.

In state 180, station 2 applies the selected Tx transmit steering vector to its antenna array and transmit a series 182 of training data units. Station 1 utilizes a different steering vector for receiving each training data unit in the series 182, and station 1 chooses a receive steering vector based on measured quality of each received training data unit in the series 182.

If stations 1 and 2 are well calibrated, the sending of Rx beamforming sequences may be unnecessary. Instead, station 1 can simply assign the $u_{RX}^1 = u_{TX}^1$, and station 2 may similarly assign $u_{RX}^2 = u_{TX}^2$.

Referring to FIG. 4, an example method 200 provides a joint bidirectional Tx and Rx sector sweeping for Tx and Rx beamforming. If implemented by a pair of multi-antenna devices 32 and 34, for example, station 2 with a timeline illustrated on the left may correspond to the device 34, and station 1 with a timeline illustrated on the right may correspond to the device 32. However, it will be understood that the terms "transmitter"/"transmitting device" and "receiver"/"receiving device" merely refer to operational states of physical devices and are not intended to always limit these devices to only receiving or transmitting in the respective communication network. For example, the device 34 in FIG. 1C may operate as a transmitter and the device 32 may operate as a receiver at some point during operation.

In state 202, station 2 sets its antenna array to an omni receive pattern mode $omni_{RX}$ in preparation for a sector sweeping procedure for Tx beamforming that station 1 initiates to determine the transmit steering vector $u_{TX}^1$. As discussed above and described in greater detail below, stations 1 and 2 may have negotiated the timeslot for the Tx beamforming procedure in advance or, as another example, a network controller may have allocated one or several timeslots for some or all of the message exchanges of the method 200. Station 1 transmits a sequence 206 of training data units which may be similar to the data units $d_1, d_2, \ldots d_n$, discussed above. Station 1 utilizes a different steering vector u for transmitting each training data unit in the sequence 206.

Station 2 receives the entire or partial (e.g., reduced by loss, rejection, etc.) sequence 206 and assesses the quality of each data unit in the sequence 206 as discussed above. In state 208, station 2 evaluates the quality of the received data units. Because station 2 receives the sequence 206 using an omni receive pattern, the quality of each received data unit depends primarily on the steering vector u that station 1 used to transmit the data unit. Station 2 identifies the best received data unit (i.e., the data unit corresponding to the best evaluated quality), or determines suitable quality metrics, such as described above, corresponding to the sequence 206.

Also in station 208, station 2 sets the antenna array of station 2 to the omni transmit pattern mode $omni_{TX}$, and station 2 transmits a sequence 210 of training data units. Meanwhile, station 1 receives the sequence 210 while switching the receive steering vector u upon so that each training data unit in the sequence 210 is received via a different steering vector. The sequence 210 includes feedback to station 1 that includes the identifier of the best received data unit in the sequence 206 or other suitable information to permit station 2 to select a suitable transmit steering vector. Additionally, the sequence 210 includes a request to initiate an Rx sector sweeping procedure at station 2. In the example of FIG. 4, station 2 includes the request along with an informational element (IE) identifying the number of training units $N_2$ to be transmitted to station 2 during the Rx sector sweeping procedure.

Similar to the Tx sector sweep procedure of station 1, station 1 can receive the entire or partial sequence 210 and assess the quality of each data unit in the sequence 210 using any desired technique. Station 1 applies a different steering vector u to its antenna array for each training data unit received as part of the sequence 210. Upon receiving the entire sequence 210 (or a local timeout event indicating that station 2 has completed the transmission of the sequence 210), station 1 selects the best one or several steering vectors and determines the receive steering vector $u_{RX}^1$ using the selection.

Additionally, after receiving the transmit steering feedback in the sequence 210, station 1 compares the reported one or several identifiers in the sequence 210 to the sequence of steering vectors used to transmit the sequence 206 of training data units, and applies any desired selection algorithm to the one or several identifiers to select the transmit steering vector $u_{TX}^1$. As one example, station 1 can simply choose the steering vector used to transmit the identified best training data unit as $u_{TX}^1$.

In state 212, station 1 applies the transmit steering vector $u_{TX}^1$ to its antenna array. It will be noted that in state 212, station 1 can already determine which steering vector yields an (at least relatively) efficient gain pattern in transmitting data to station 2. Station 1 can then proceed to transmit $N_2$ training data units to station 2 (sequence 216), using the steering vector $u_{TX}^1$. Station 1 transmits the sequence 216 in response to the request to initiate an Rx sector sweeping procedure at station 2 included in the sequence 210. The sequence 216 may include a request for station 2 to perform transmit beamforming training.

Similar to the Rx sector sweep procedure of station 1, station 2 can receive the entire or partial sequence 216 and assess the quality of each data unit in the sequence 216 using any desired technique. Station 2 applies a different steering vector u to its antenna array for each training data unit received as part of the sequence 216. Upon receiving the entire sequence 216 (or a local timeout event indicating that station 1 has completed the transmission of the sequence 216), station 2 selects the best one or several steering vectors and determine the receive steering vector $u_{RX}^2$ using the selection.

In state 220, station 1 sets its receive steering vector to $u_{RX}^2$. In response to the request for transmit beamforming training in the sequence 216, station 2 transmits a sequence 222 of training data units while switching the steering vector u upon transmitting each training data unit in the sequence 222. Similar to station 1, station 2 can include a sequence number or another type of an identifier in each training data unit so that station 1 can reply with the best one or several identifiers in a message 224. Upon receiving the message 224, station 2 can identify the transmit steering vector $u_{TX}^2$.

In some embodiments, each procedure for determining a respective vector $u_{RX}^1$, $u_{RX}^2$, $u_{TX}^2$, or $u_{TX}^1$ may occupy a separate timeslot so that the method 200, absent sufficiently good calibration of stations 1 and 2, occupies four timeslots. In other embodiments, the entire bidirectional Tx and Rx sweeping procedure of the method 200 are implemented in a single timeslot, pre-allocated by a network controller or negotiated by one or both of the stations in real time. Further, in some implementations, some of the messages discussed with reference to FIG. 4 can be separated. For example, stations 1 and 2 may report feedback related to Tx sector sweeping separately from request Rx sector sweeping.

Further with respect to FIG. 4, a pair of devices (e.g., the transmitter 12 and the receiver 14 of FIG. 1A) in which only one of the devices is equipped with multiple antennas may easily bypass some of the stages or steps of the method 200 by controlling parameters in the messages 210, 216, or 222, for example. In particular, to indicate to station 1 that station 2 does not require an Rx sector sweeping procedure (because station 2 has only one antenna), station 2 can set the IE that specifies $N_2$ to zero. Further, station 1 can retain this information for the duration of the method 200 so as to omit both the Rx sector sweeping at station 2 and Tx sector sweeping at station 2 (sequence 222). Of course, stations 1 and 2 may also choose to set $N_1$ or $N_2$ to zero when multiple antennas are available but the sector sweeping procedure is not desired. Thus, if station 2 only has one antenna, the messages/message sequences 216, 222 and 224 can be omitted.

If stations 1 and 2 are well calibrated, exchanging some of the training sequences of the method 200 may be unnecessary. Instead, station 1 can simply assign the $u_{RX}^1 = u_{TX}^1$, and station 2 may similarly assign $u_{TX}^2 = u_{RX}^2$.

FIG. 5 illustrates a method 250 largely similar to the method 150 of FIG. 3, except that stations 1 and 2 conduct multiple iterations (or "sweeps") of beamforming using sector sweeping when implementing the method 250. Thus, sweep 1 may include the same states and message exchanges as the entire procedure of method 150. However, sweep 1 of the method 250 may include a smaller number of sectors (i.e., vectors u and, correspondingly, training data units d). In this sense, sweep 1 can be a "coarse" sweep or iteration of the method 250. In the next sweep, stations 1 and/or 2 can refine the range of sectors in view of the previous iteration. For example, station 1 can use the results of the first sweep to calculate an approximate range in which the subsequent one or more sweeps should occur. In this manner, stations 1 and 2 can gradually develop efficient values for transmit and receive steering vectors. The iterative sweeping of the method 250 may be conducted in one timeslot or over a period spanning multiple timeslots.

Figure 6:
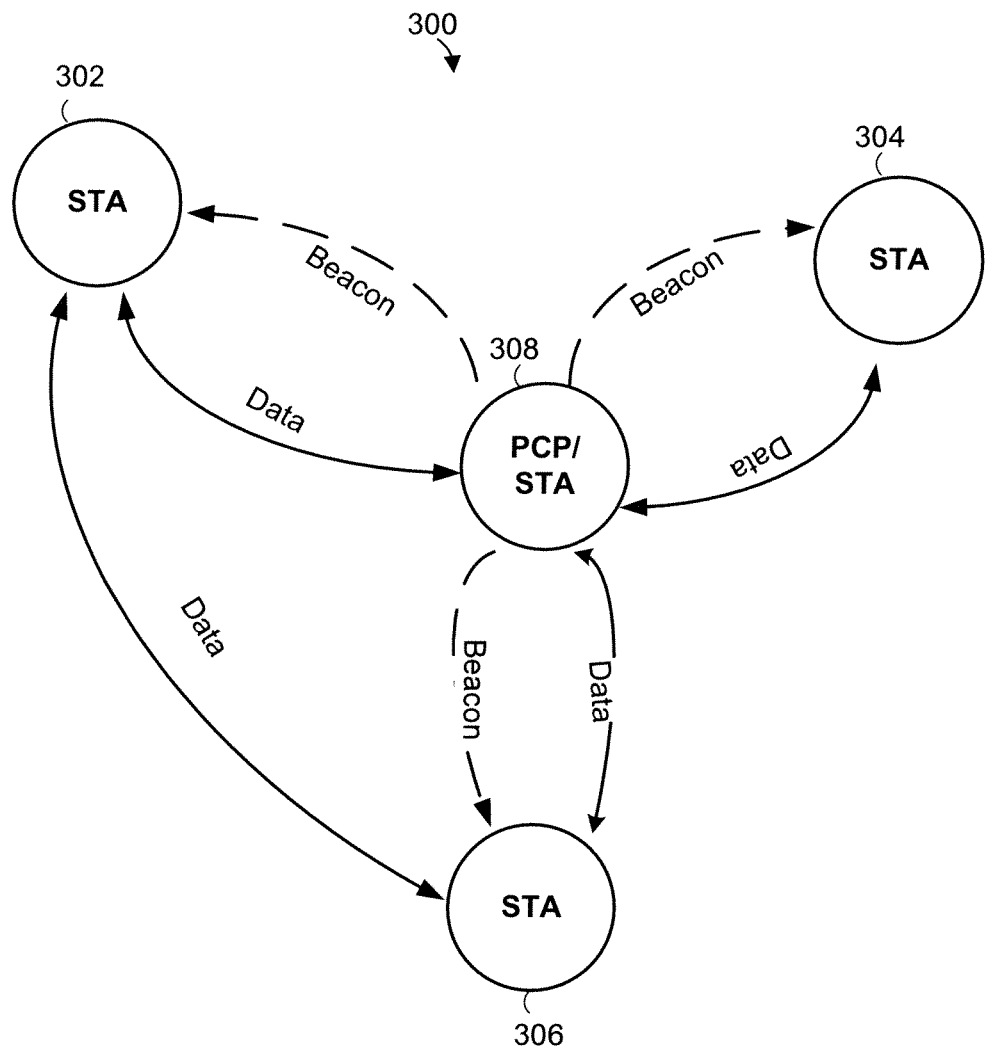
FIG. 6 a block diagram of an example network in which beamforming by sector sweeping may be used for beamforming training.

FIG. 6 is a block diagram of an example communication network 300 in which sector sweeping can be used between devices or stations to develop transmit beamforming vectors or matrices. The network 300 may be a piconet for example. The network 300 includes stations 302, 304, 306 and 308. If the network 300 is a piconet, the station 308 may be a piconet central point (PCP). In other implementations, the station 308 may be an access point, a base station, etc. As will be described further below, the PCP 308 transmits a beacon to alert stations proximate to the PCP 308 of the presence of the PCP 308. When a station, such as station 302, 304, or 306 detects a beacon, the station may attempt to establish a connection with the PCP 308. Part of the process of connecting may include beamforming training (BFT). BFT may be performed in a variety of suitable ways, including BFT by sector sweeping such as described above.

In one implementation, the PCP 308 coordinates communication in the network 300. For example, the PCP 308 can establish time frames, each time frame having timeslots during which different types of protocol functions are performed. Each time frame may begin with the PCP 308 transmitting one or more beacons. Later in the time frame data may be exchanged between the stations 302, 304, 306 and 308.

In one implementation, the network 300 may operate according to a protocol that provides timeslots for beamforming training. For example, a beacon interval (or a superframe) can include one or more timeslots for beamforming training.

Figure 7:
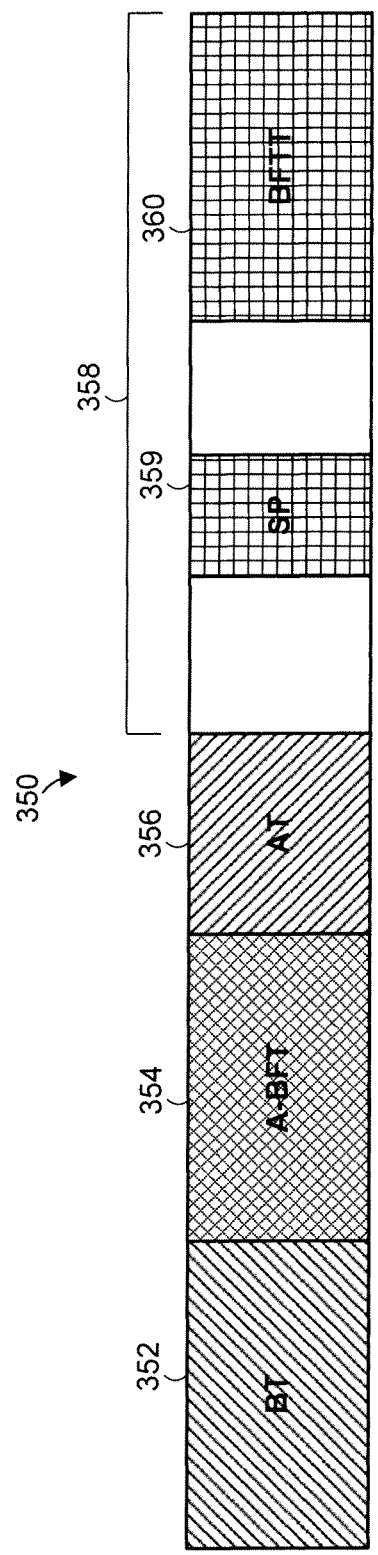
FIG. 7 is a diagram of a superframe of a communication protocol.

When stations 302, 304, 306 detect the beacon, each station 302, 304, 306 can transmit training data to the PCP 308 during a beamforming timeslot. FIG. 7 is a diagram of an example beacon interval (or superframe) 350 including several timeslots serving different purposes. Timing of the beacon interval 350 can be established by a PCP. Beacon interval 350 includes a beacon time (BT) timeslot 352, an association beamforming training (A-BFT) timeslot 354, an allotment time (AT) timeslot 356, a data transmit time (DTT) timeslot 358 and a beamform training time (BFTT) timeslot 360. In one implementation, the BT timeslot 352 is used by the PCP to transmit beacons. In one implementation, the A-BFT timeslot 354 is a timeslot used for new stations not yet beamformed with the PCP to perform beamforming training with the PCP. The AT timeslot 356 is used for exchanging management frames between the PCP and stations in the network may be used by the PCP to allocate and schedule the DTT timeslot 358. Thus, a PCP can utilize the AT timeslot 356 to change the length of various timeslots within the DTT timeslot 358 such as service periods (SPs) 359, contention-based periods, BFT periods, etc. The AT timeslot 356 also can be used to exchange management frames, for example, for association, channel measurement, etc. The DTT timeslot 358 can be used to transmit data between the PCP and a communicating station and for transmitting data between non-PCP stations known to each other through information requests and responses. As discussed above, the DTT timeslot 358 can include timeslots that can be allocated and scheduled by the PCP. The BFTT timeslot 360 may be used to perform BFT with known stations including between the PCP and a station and between two non-PCP stations. The BFTT timeslot 360 can be a timeslot within the DTT timeslot 358 and thus may be allocated/scheduled by the PCP. Although FIG. 7 illustrates one BFTT timeslot 360 at the end of the DTT timeslot 358, one or more BFTT timeslots 360 can be included at many different locations within the DTT timeslot 358. Generally, each BFTT timeslot 360 corresponds to a beamforming training opportunity between a pair of stations (including the PCP). Although the beacon interval 350 is shown in FIG. 7 with specific types of timeslots in a specific order, one or more additional types of timeslots can be included, one or more illustrated timeslots can be omitted, and the order of timeslots may be different during a given beacon interval.

When new stations wish to connect with the PCP, the new stations can attempt to perform BFT during the A-BFT timeslot 354.

Sharing of PCP Transmit Beamforming Sector Sweeping

Transmit beamforming by sector sweeping performed by the PCP incurs considerable overhead. For example, when a PCP performs transmit beamforming sector sweeping with a single station, each sweep corresponding to transmitting in 32 different directions, it estimated that this may utilize 5% of a single beacon interval in one particular implementation. Thus, transmit beamforming sector sweeping tends to leave less time for actual data transmission.

An example technique for reducing such overhead generally involves multiple stations utilizing a single transmit beamforming sector sweep by the PCP. For instance, while a first station performs BFT with the PCP, a second station can listen to the transmit beamforming sector sweeping transmissions from the PCP to the first station, and can use the sector sweeping transmissions from the PCP to the first station to determine quality metrics corresponding to beamforming for the PCP-to-second station communication link.

Figure 8:
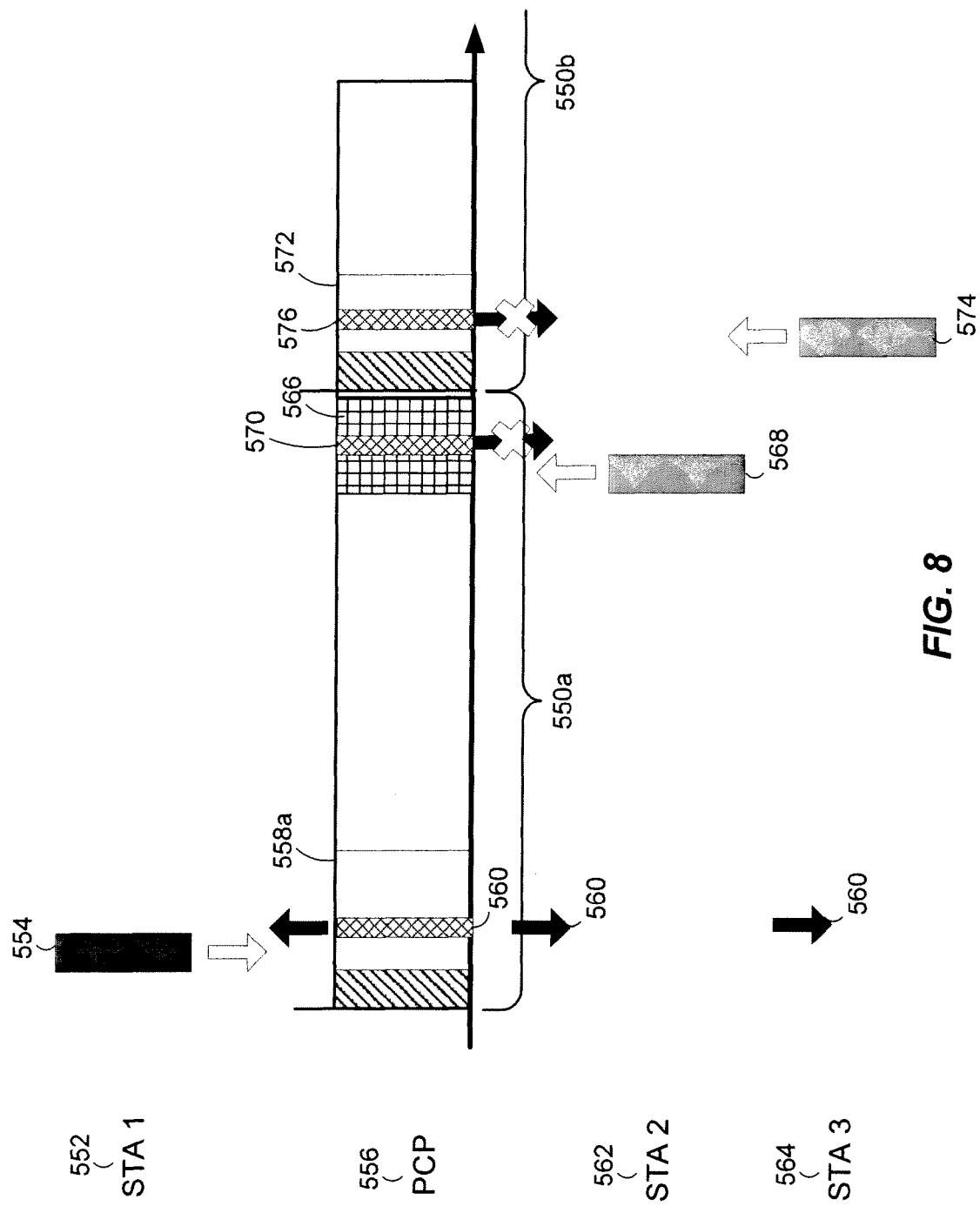
FIG. 8 is a timing diagram of an example in which multiple stations utilize a single beamforming sector sweep by a PCP.

FIG. 8 is a timing diagram illustrating two beacon intervals 550. In a first beacon interval 550a, a station 552 transmits BFT data units 554 corresponding to a transmit beamforming sector sweep to a PCP 556 during an A-BFT timeslot 558a. In response, the PCP 556 transmits data units 560 corresponding to a transmit beamforming sector sweep to the station 552. But the data units 560 are also received by a station 562 and a station 564. The station 562 can utilize the data units 560 to determine quality metrics corresponding to beamforming for a PCP-to-station 562 communication link. Similarly, the station 564 can utilize the data units 560 to determine quality metrics corresponding to beamforming for a PCP-to-station 564 communication link.

During a BFTT timeslot 566, the station 562 performs transmit beamforming sector sweeping with the PCP 556 by sending BFT data units 568 to the PCP 556. Normally, the PCP 556 would also perform transmit beamforming sector sweeping with the station 562 by sending BFT data units 570 to the station 562. But if the station 562 was able to utilize the data units 560 to determine quality metrics corresponding to beamforming for the PCP/station 562 communication link, transmission of the data units 570 can be skipped. Thus, overhead due to BFT sector sweeping can be reduced.

During an A-BFT timeslot 572 in the beacon interval 550b, the station 564 performs transmit beamforming sector sweeping with the PCP 556 by sending BFT data units 574 to the PCP 556. Normally, the PCP 556 would also perform transmit beamforming sector sweeping with the station 564 by sending BFT data units 576 to the station 564. But if the station 564 was able to utilize the data units 560 to determine quality metrics corresponding to beamforming for the PCP/station 564 communication link, transmission of the data units 576 can be skipped. Thus, overhead due to BFT sector sweeping can be reduced.

In one implementation, a field is included in a BFT data unit sent from a station that has received transmit beamforming sector sweeping data units from the PCP that were intended for another station. The field can be set to indicate whether the station wishes to skip receiving transmit beamforming sector sweeping data units from the PCP. For example, the station 562 can set such a field when sending the data units 568 to the PCP 556. Upon receiving the data units 568, the PCP 556 can determine whether to skip sending the data units 570 to the station 562. Similarly, the station 564 can set such a field when sending the data units 574 to the PCP 556. Upon receiving the data units 574, the PCP 556 can determine whether to skip sending the data units 576 to the station 564. In one implementation, a BFT sector sweeping data unit can include a field used to indicate how many sweep directions the PCP can employ when performing the transmit beamforming sector sweep with the station. In one implementation, the station sets this field to a number, such as zero, that indicates that the station wishes to skip receiving transmit beamforming sector sweeping data units from the PCP.

In some implementations, beacon data units sent by a PCP can be utilized as transmit beamforming training data units. For instance, the PCP can include data in each beacon data unit to indicate that it can be used for transmit beamforming training, and the PCP can transmit multiple beacon data units, each beacon data unit transmitted using a different steering vector. The multiple beacon data units transmitted using different steering vectors can be transmitted in the BT timeslot, for example.

A transmit beamforming by sector sweeping (TxSW) IE can be included in a beacon data unit to indicate that the beacon data unit is also serving as a TxSW training data unit. Stations that receive beacon data units with the TxSW IE can choose to skip the PCP TxSW stage in their beamforming training processes. The TxSW IE can include an indicator of a number of beam refinement training sequences that will be transmitted by the PCP in the subsequent beamforming refinement iteration. The TxSW IE also can include a field (or fields) for requesting and providing BFT feedback. The TxSW IE also can include a field to indicate an upper limit (e.g., 4, 8, 16, 32, 64, etc.) to a number of transmit beamforming sector sweep data units that can be transmitted by a station to the PCP. The TxSW IE also can include a field to indicate an upper limit (e.g., 4, 8, 16, 32, 64, etc.) to a number of receive beamforming sector sweep data units that can be transmitted by a station to the PCP. The TxSW IE also can include one or more field to provide subsequent beamforming refinement parameters. One example format for a TxSW IE is provided in Table 1. Of course, other suitable formats can also be utilized. For instance, one or more elements in Table 1 can be omitted and/or one or more other elements can be added. With the example format of Table 1, a different order and/or different field sizes can be utilized.

TABLE 1

| Order | Information | Size (bytes) | Notes |
| --- | --- | --- | --- |
| 1 | Element ID | 1 | TxSW IE |
| 2 | Length | 1 | |
| 3 | Beam refinement parameters | 4 bits | Parameters related to beam refinement. |
| 4 | FBCK-REQ | 8 bits | Feedback requested for BFT. |
| 5 | TX SLIMIT | 3 bits | Upper limit (4, 8, 16, 32, 64) to the number of transmit beamforming sector sweep packets in the reverse direction |
| 6 | RX SLIMIT | 3 bits | Upper limit (4, 8, 16, 32, 64) to the number of receive beamforming sector sweep packets in the reverse direction |

A beacon countdown field (CDOWN) field can be included in a beacon data unit. For example, CDOWN can be a subfield in a beacon control field or a TxSW IE. CDOWN is a counter indicating the number of beacon frames to the end of a BT timeslot. In one implementation, CDOWN acts as a down-counter, and is zero in the last beacon frame of the BT timeslot. CDOWN can have any suitable range. In one implementation, CDOWN has a maximum value of 63 and should be zero in the last beacon frame of the BT timeslot. If a station does not receive all of the beacon frames (for example, the station only receives one beacon frame), the station can determine the end of the beacon timeslot based on the CDOWN value in a received beacon frame and a duration of the beacon frame.

As discussed above, using TxSW training sequences intended for other stations or using beacon data units for TxSW training sequences can allow stations to forego having the PCP transmit a TxSW training sequence to the station. In one particular implementation, each TxSW training sequence utilizes 5% of the beacon interval. Thus, each TxSW training sequence that is skipped may provide a significant reduction in the overhead of the communication system, i.e., more of the beacon interval can be utilized for exchanging user data rather than performing beamforming training.

Transmit Beamforming Sequencing

A chosen sequence in which transmit beamforming sector sweeping data units are transmitted can reduce the sensing delay of stations receiving from a PCP and/or help reduce the number of collisions when new stations are conducting transmit sector sweeping. FIG. 9A is a diagram illustrating two stations (N1 and N2) performing transmit beamforming sector sweeping with a station P. In FIG. 9A, the direction of the arrows generally indicates the direction of the beam with respect to P, and the numbers indicate the order in which the different beams are transmitted.

Station N1 transmits in a sequential fashion with respect to direction. For example, station N1 begins in a starting direction and gradually rotates the direction around 360 degrees. Because of directionality, station P may not receive a transmission from station N1 until the fifth transmission.

On the other hand, station N2 transmits in a more randomized fashion with respect to direction. In the example shown in FIG. 9A, sets of adjacent transmissions by station N2 are 180 degrees apart (i.e., transmissions 1 and 2; transmissions 3 and 4; transmissions 5 and 6; transmissions 7 and 8). As a result, station P may receive a transmission from station N2 on only the second transmission. Thus, a randomized order of transmissions with respect to direction more quickly span the space surrounding a station and thus can reduce the delay, on average, of another station receiving a transmission.

At the beginning of an A-BFT timeslot, for example, the PCP needs to sense the channel and decide whether a new station is conducting transmit beamforming sector sweeping. If the PCP decides there is not a new station, the PCP can end the A-BFT timeslot and start the AT timeslot early. If stations utilize an ordering such as the station N2 in FIG. 9A, the PCP can wait less time before deciding whether there is a new station. As another example, before sending a beacon, the PCP can sense the channel to determine whether other PCPs are transmitting beacons at the same time. If the other PCPs utilize an ordering such as the station N2 in FIG. 9A, the PCP can wait less time before deciding whether there are other PCPs transmitting.

Utilizing randomized ordering with respect to direction will also help stations avoid constant collisions among multiple transmitting devices. Utilizing randomized ordering with respect to direction can be applied with beacon transmissions as well as with transmissions during the A-BFT timeslot, for example.

Determining a randomized order with respect to direction can be implemented in a variety of suitable ways. As one example, a direction of the first transmission is randomly selected, and directions for subsequent transmissions can also be randomly selected from the remaining directions. As another example, the direction of a subset of transmissions is randomly selected, and the directions of the remaining transmissions are determined deterministically based on the randomized directions of the subset. For instance, in FIG. 9B, odd transmissions are randomized, and each even-numbered transmission is 180 degrees apart from the previous odd-numbered transmission. As yet another example, the direction of the first transmission is randomized, and the directions of all subsequent transmissions are determined deterministically based on the direction of the first transmission. As used herein, the term "randomized" refers to both random and pseudo-random determinations.

Collisions During Beamforming Training

Figure 10:
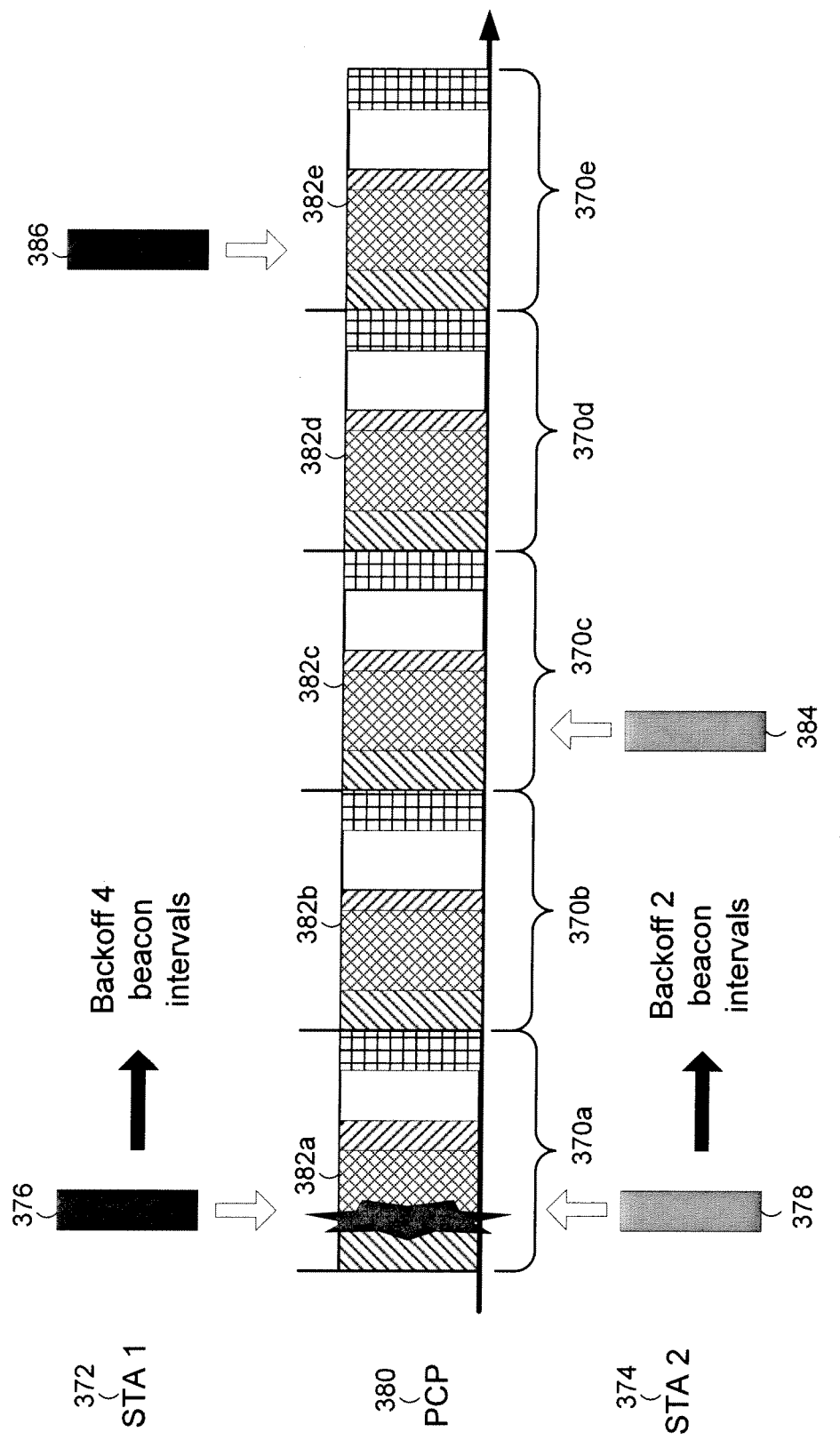
FIG. 10 is a timing diagram illustrating a collision between two beamforming training transmissions sent to a piconet central point (PCP) and an example backoff routine.

As discussed previously, if a system includes more than two devices, collisions may occur during a beamforming training process. For example, referring again to FIG. 7, if multiple stations attempt to perform BFT during the same A-BFT timeslot 354, a collision may occur. When this happens, the information carried in the beamforming training transmission may be corrupted or not discernable to the PCP and the BFT process cannot be completed. FIG. 10 is a timing diagram illustrating several beacon intervals 370. In a first beacon interval 370a, a station 372 and a station 374 attempt to transmit BFT data units 376, 378, respectively, to a PCP 380 during an A-BFT timeslot 382a. A collision occurs and each of the stations 372, 374 performs a backoff procedure in response to the collision. In the example of FIG. 10, the station 372 backs off for four beacon intervals 370 and the station 374 backs off for two beacon intervals 370. Thus, in beacon interval 370c, the station 374 transmits BFT data units 384 during A-BFT timeslot 382c. In beacon interval 370e, the station 372 transmits BFT data units 386 during A-BFT timeslot 382e. If both stations 372, 374 happened to select the same number of beacon intervals to back off, then another collision may occur and the backoff process is repeated.

The backoff process illustrated in FIG. 10 can be inefficient and may waste a considerable amount of time. Further adding to the inefficiency, an A-BFT time period 382 may not occur during every beacon interval 370. For example, the network can be configured such that an A-BFT occurs once every ten beacon intervals 370. The frequency with which an A-BFT occurs is a tradeoff between efficiency and network access latency. When an A-BFT does not occur during every beacon interval, stations that experienced a collision during A-BFT may be forced to wait a considerable amount of time before attempting to associate with the PCP. For example, the probability that k new stations present during an A-BFT interval may be assumed to be Poisson distributed, with a mean G:

$$Pr[k] = \frac{G^k e^{-G}}{k!} \quad \text{(Equ. 1)}$$

With the probability given by Equ. 1, the probability of a collision during the A-BFT timeslot is:

$$Pr_{collision} = 1 - e^{-G} \quad \text{(Equ. 2)}$$

In one embodiment, when two or more new stations transmit beamforming training frames or data units during the same A-BFT timeslot, resulting in a collision, a PCP may be able to receive some of the BFT data units correctly. That is, a PCP may receive from a transmitting station one or more BFT data units and may be able to determine the station that is attempting to perform BFT. For example, the PCP may be able to recover an address (e.g., a media access control (MAC) address) of the transmitting station (i.e., a source address) from BFT transmissions that resulted in the collision. Instead of waiting for the stations to backoff and re-attempt BFT at a later time, the PCP can poll the stations to prompt the stations to redo beamforming training (e.g., retransmit a beamforming training sequence) or continue with beamforming refinement.

Figure 11:
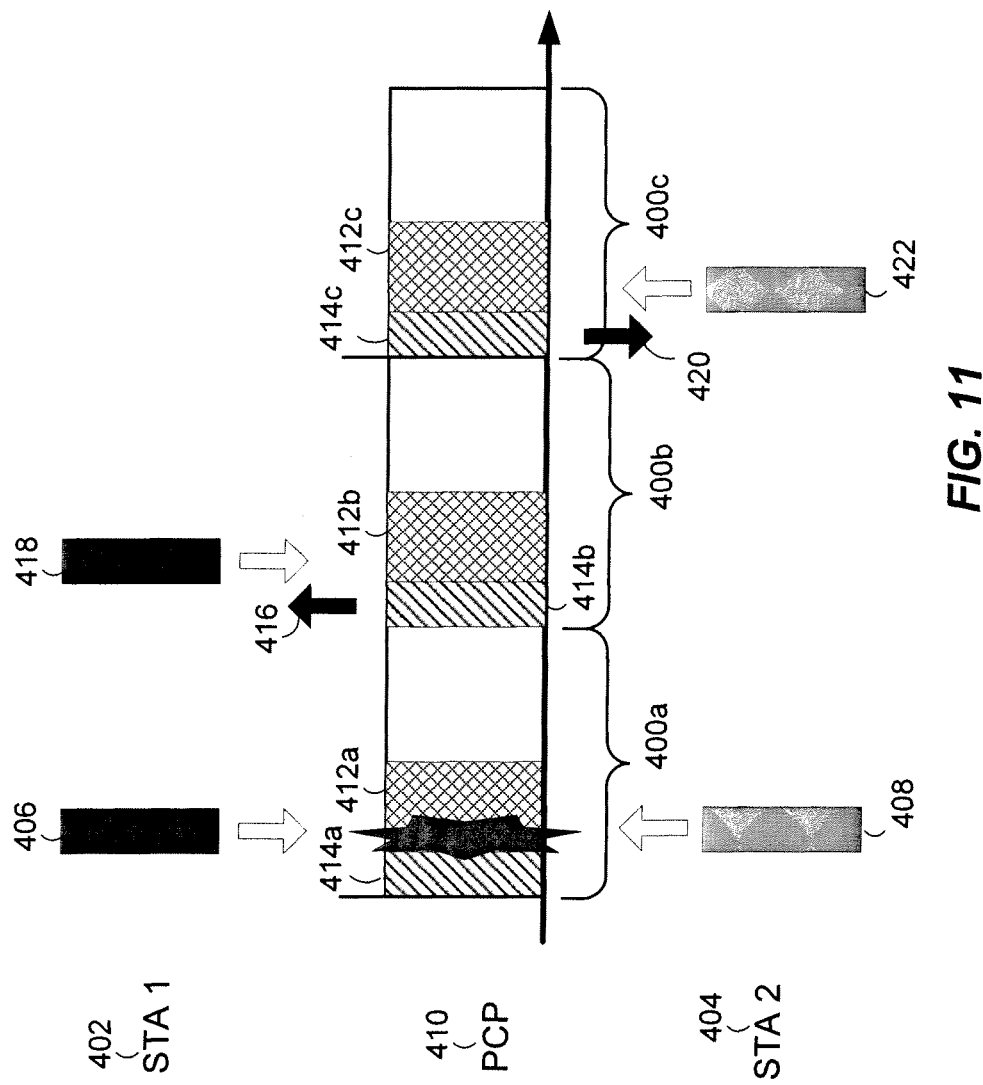
FIG. 11 is a timing diagram of an example in which a PCP polls for stations during two separate beacon intervals subsequent to a collision.

FIG. 11 is a timing diagram illustrating several beacon intervals 400. In a first beacon interval 400a, a station 402 and a station 404 attempt to transmit BFT data units 406, 408, respectively, to a PCP 410 during an A-BFT timeslot 412a. A collision occurs but the PCP 410 is able to determine that stations 402 and/or station 404 is attempting to perform BFT with the PCP 410 because the PCP 410 received at least one of the training data units 406 and/or at least one of the training data units 408. From the successfully received data units, the PCP may be able to determine the address(es) (e.g., MAC address(es)) of the station 402 and/or the station 404.

Assuming that the PCP 410 was able to determine the address of station 402, during a BT timeslot 414b in a next beacon interval 400b, the PCP 410 sends a poll signal 416 to the station 402 instructing the station 402 to perform BFT during the A-BFT period 412b. In response to the poll signal 416, the station 402 transmits BFT data units 418 to the PCP 410. Similarly, assuming that the PCP 410 was able to determine the address of station 404, during a BT timeslot 414c in a beacon interval 400c, the PCP 410 sends a poll signal 420 to the station 404 instructing the station 404 to perform BFT during the A-BFT period 412c. In response to the poll signal 420, the station 404 transmits BFT data units 422 to the PCP 410. The poll signals 416, 418 can be sent via beacons or BFT scheduling frames, for example. Although in the example of FIG. 11 the polls 416, 420 were transmitted after the beacon interval 400a, in other implementations, the PCP 410 can poll a station during the beacon interval during which the collision occurred. The PCP 410 can achieve this by sending a BFT slot grant/allocation frame to the station during the AT timeslot, for example.

As an alternative to polling such as discussed above with reference to FIG. 11, when a PCP retrieves information about new stations during a collision, the PCP can treat those stations as known stations. Thus, since the stations are considered known, the PCP can permit the stations to BFT during a BFTT time slot rather than during an A-BFT timeslot. As discussed above, BFTT timeslots can be located within the DTT timeslot. Thus, the PCP can send a BFT slot grant/allocation frame (e.g., a type of management frame) to the station during the AT timeslot of the corresponding beacon interval to allocate a BFTT timeslot for beamforming between the PCP and the station.

Figure 12:
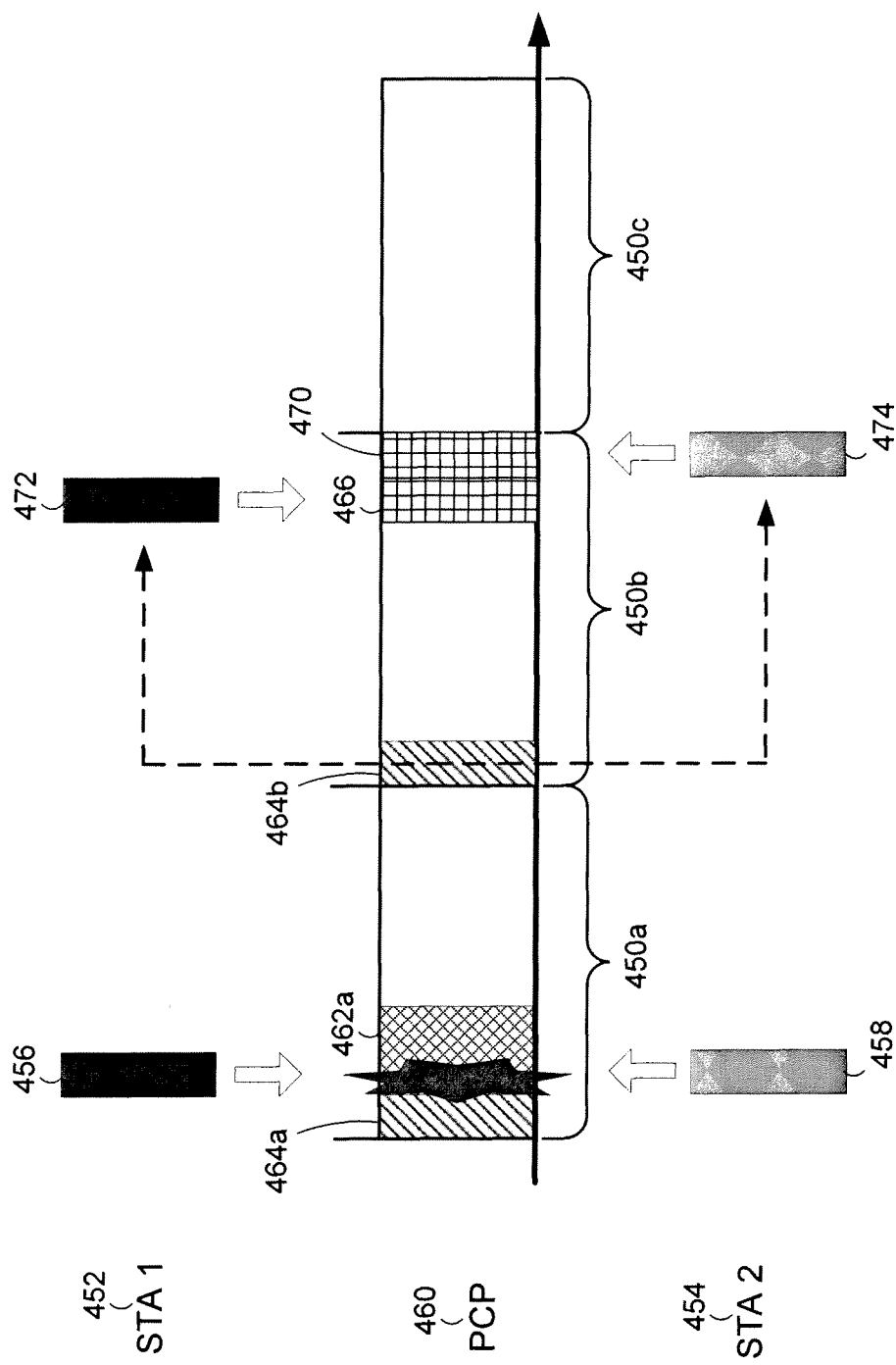
FIG. 12 is a timing diagram of an example in which a PCP polls for stations during a single beacon interval subsequent to a collision.

FIG. 12 is a timing diagram illustrating several beacon intervals 450. In a first beacon interval 450a, a station 452 and a station 454 attempt to transmit BFT data units 456, 458, respectively, to a PCP 460 during an A-BFT timeslot 462a. A collision occurs but the PCP 460 is able to determine that the station 452 and/or station 454 are attempting to perform BFT with the PCP 460 because the PCP 460 received at least one of the training data units 456 and/or at least one of the training data units 458.

During a BT timeslot 464b in a next beacon interval 450b, the PCP 460 polls the station 452 and the station 454. The polling by the PCP 460 includes sending BFT scheduling information to the station 452 instructing the station 452 to perform BFT during a BFTT timeslot 466 during the beacon interval 450b. Similarly, polling by the PCP 460 includes sending BFT scheduling information to the station 454 instructing the station 454 to perform BFT during a BFTT timeslot 470 during the beacon interval 450b. In response to the BFT scheduling information, the station 452 transmits BFT data units 472 to the PCP 460 during the timeslot 466, and the station 454 transmits BFT data units 474 to the PCP 460 during the timeslot 470. Additionally, the BFT scheduling information for the station 452 and/or the station 454 can be sent during the AT time slot via grant/scheduling frame(s). The BFT scheduling information could be sent in an AT timeslot in the beacon interval 450a or the beacon interval 450b. If the BFT scheduling information is sent in the AT timeslot of the beacon interval 450a, the allocated BFTT timeslots 466 and 470 can be located in the beacon interval 450a. Although the slots 466 and 470 are illustrated in FIG. 12 as being adjacent and located at the end of the beacon interval 450b, the slots 466 and 470 need not be adjacent and need not be located at the end of a beacon interval.

Figure 13:
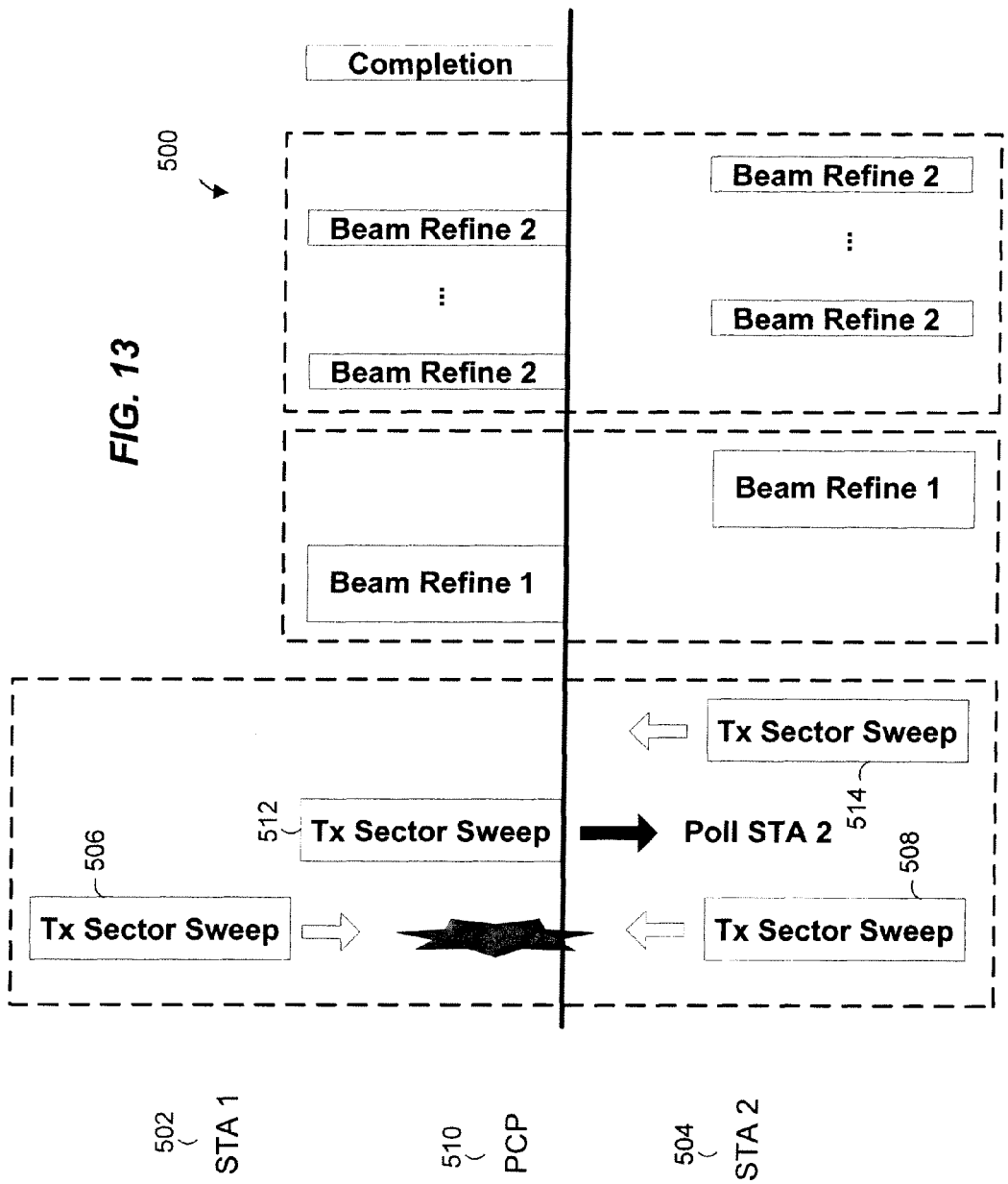
FIG. 13 is a timing diagram of an example in which a PCP polls for a station during a beacon interval in which a collision occurred.

As discussed above, instead of waiting for a subsequent beacon interval before polling detected stations, a PCP can seek to continue the BFT process immediately following a detection of any BFT sequence during the same A-BFT timeslot. FIG. 13 is a timing diagram illustrating a portion of an A-BFT timeslot 500. In the A-BFT timeslot 500, a station 502 and a station 504 attempt to transmit BFT data units 506, 508, respectively, to a PCP 510. A collision occurs but the PCP 510 is able to determine at least that the station 504 is attempting to perform BFT with the PCP 510 because the PCP 510 received at least one of the training data units 508. If the PCP 510 receives at least one of the training data units 506, the PCP 510 is also able to determine that the station 502 is attempting to perform BFT with the PCP 510. In the scenario illustrated in FIG. 13, the PCP 510 immediately polls the station 504. Polling the station 504 can include transmitting BFT data units 512 to the station 504 to perform course BFT sector sweeping. The PCP 510 can also transmit a single feedback frame followed by a BFT grant/scheduling frame in the AT timeslot to schedule a BFT time slot in the DTT timeslot for station 504 to redo or continue BFT. In response to the poll by the PCP 510, the station 504 can transmit BFT data units 514 to the PCP 510 to redo BFT sector sweeping or continue with beam refinement. Subsequently, the station 504 and the PCP 510 can transmit to each other further BFT data units to perform one or more rounds of BFT refinement.

When a PCP detects a collision in the A-BFT timeslot, the PCP can increase the AT/A-BFT appearance frequency to accommodate multiple new stations. For example, instead of an A-BFT occurring every ten beacon intervals, a PCP can decide to increase the occurrence of A-BFT timeslots so that an A-BFT occurs every five beacon intervals.

One or more (or none) of the following information elements (IEs) can be included in a beacon data unit transmitted by a PCP.

An A-BFT polling IE can be utilized to poll an unassociated station, with a known MAC address, to perform BFT during the A-BFT timeslot that follows the BT timeslot in which the beacon was transmitted. The A-BFT polling IE can include the MAC address of the station being polled, or a simplified MAC address (e.g., a subset of the MAC address such as the last byte or last several bytes of the MAC address). A station that receives a beacon and whose address matches the address in the A-BFT polling IE in the beacon can recognize that it is to perform BFT in the next A-BFT timeslot. A station that receives the beacon and whose address does not match the address in the A-BFT polling IE in the beacon can recognize that it is not to perform BFT in the next A-BFT timeslot. One example format for an A-BFT polling IE is provided in Table 2. Of course, other suitable formats can also be utilized. For instance, one or more elements in Table 2 can be omitted and/or one or more other elements can be added. With the example format of Table 2, a different order and/or different field sizes can be utilized.

TABLE 2

| Order | Information | Size (bytes) | Notes |
|---|---|---|---|
| 1 | Element ID | 1 | A-BFT Polling IE |
| 2 | Length | 1 | |
| 3 | New station address | 1-6 | MAC address or simplified MAC address of the new station |

A BFTT allocation IE can be included in a beacon data unit and/or in an announcement data unit. The BFTT allocation IE can be used to allocate BFTT slots to stations already associated with the PCP or stations new to the PCP. The BFTT allocation IE can include an identifier of a station that is to be allocated BFTT slots. The identifier can be a MAC address, a simplified MAC address, a station identifier (ID) assigned to the station by the PCP, etc. If BFTT slots are to be allocated for station-to-station BFT, the BFTT allocation IE can include an identifier of a second station. One example format for a BFTT allocation IE is provided in Table 3. Of course, other suitable formats can also be utilized. For instance, one or more elements in Table 3 can be omitted and/or one or more other elements can be added. With the example format of Table 3, a different order and/or different field sizes can be utilized.

TABLE 3

| Order | Information | Size (bytes) | Notes |
|---|---|---|---|
| 1 | Element ID | 1 | BFTT Allocation IE |
| 2 | Length | 1 | |
| 3 | Number of BFT opportunities for new stations | 2 bits | BFT between PCP and new stations |
| | Number of BFT opportunities for existing stations | 3 bits | BFT between PCP and existing stations |
| | Number of BFT opportunities for station pairs | 3 bits | BFT between PCP and new station pairs |
| 4 | Station 1 address/ID | 1-6 | New station is listed first and indicated by MAC address or simplified MAC address; existing station is indicated by station ID |
| 5 | Station 2 address/ID | 0-1 | This field is used for station-to-station BFT |
| 6 | BFT slot starting time | 2 | |
| 7 | BFT slot duration | 2 | |

Power Saving During Association Beamforming Training

Stations not involved in association beamforming training (A-BFT) should be allowed to go to sleep during the A-BFT timeslot. But the length of the A-BFT timeslot can be very dynamic. For example, the A-BFT-timeslot can end when a collision occurs. Also, when a collision occurs, the PCP may not be able to determine when a TxSW of station will end.

In one implementation, the PCP sets a limit of the A-BFT duration and transmit an indication of the duration limit in the beacon data units. Stations can use the duration limit to go to sleep for the duration limit during the A-BFT timeslot. If the duration limit is not long enough to permit a complete beamforming training process, the process can be continued in a subsequent beacon interval. If the duration limit is more than enough to complete beamforming training or if the PCP ends the A-BFT early, the PCP can utilize the remaining time in the A-BFT timeslot to communicate with new stations and/or to other awake stations. Also, if a field such as the SLIMIT field of Table 1 is included, the PCP can calculate an end of a station TxSW process when the PCP does not receive TxSW data units from the station due to a collision, for example.

Thus, an A-BFT IE can include one or more of an indication of a maximum duration of the A-BFT timeslot, a field (e.g., SLIMIT) to indicate an upper limit (e.g., 4, 8, 16, 32, 64, etc.) to a number of transmit beamforming sector sweep data units that can be transmitted by a station to the PCP, a new station MAC address or simplified MAC address, etc. The A-BFT IE field can be included in a beacon data unit and/or an A-BFT data unit transmitted by a PCP.

Figure 14:
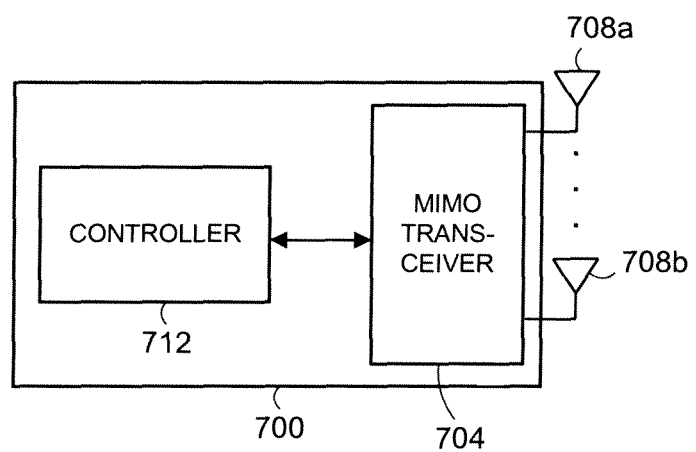
FIG. 14 is a block diagram of an example device that may implement methods described herein.

FIG. 14 is a block diagram of an example wireless communication device 700 that can implement one or more of the above-discussed example methods. Referring again to FIGS. 1A, 1B, 1C, 3 and 7, the device 700 can be utilized for one or more of the example devices 12, 14, 22, 24, 32, 34, 100, 302, 304, 306, and 308. For instance, the device 700 can be utilized as a PCP or a station communication with a PCP.

Referring now to FIG. 14, the device 700 includes a transceiver 704 and one or more antennas 708. A controller 712 is coupled to the transceiver 704. The device 700 can implement the device 100 of FIG. 2, for example. In one implementation, the transceiver 704 includes at least a portion of the device 100, such as the transmit path 104, the beamforming controller 106 and the beamforming network 135. In this implementation, the controller 712 includes the vector selection unit 110.

If the device 700 is acting as a PCP, the controller 712 can, in some scenarios, generate beacon data units that also serve as transmit beamforming training data units. For instance, the controller 712 can include an indicator in each beacon data unit that informs stations that the beacon data unit also serves as a transmit beamforming training data unit. For example, the controller 712 can include a TxSW IE in each beacon data unit, as discussed above. Additionally, the controller 712 can receive feedback from stations that inform the PCP that the PCP can skip transmitting transmit beamforming training data units to the station. As discussed above, the station can transmit a data unit to the PCP that includes a field used to indicate how many sweep directions the PCP can employ when performing the transmit beamforming sector sweep with the station, and the station can set this field to a predetermined value, such as zero, to indicate that the PCP can skip sending transmit beamforming data units. Thus, the controller 712 can check this field to determine whether to skip sending transmit beamforming data units, and the controller 712 can cause the device 700 to skip sending transmit beamforming data units to the station when indicated by this field.

If the device 700 is acting as an unbeamformed station communicating with a PCP, the controller 712 can detect beamforming training data units transmitted by the PCP that also serve as beacon data units or that were transmitted to another station. The controller 712 can utilize these detected beamforming training data units for beamforming training with the PCP. Additionally, the controller 712 can transmit a signal to the PCP to inform the PCP that it can skip sending beamforming training data units to the station. For example, the controller 712 can cause the transceiver 704 to transmit a data unit to the PCP that includes a field used to indicate how many sweep directions the PCP can employ when performing the transmit beamforming sector sweep with the station, and the controller 712 can set this field to a predetermined value, such as zero, to indicate that the PCP can skip sending transmit beamforming data units.

Also, if the device 700 is acting as a PCP, the controller 712 can determine that a station transmitted a beamforming training transmission that was corrupted by a collision, and in response cause the transceiver 704 to transmit a signal to the station to prompt the station to retransmit a beamforming training sequence or continue with beam refinement. If the device 700 is acting as a station communicating with a PCP, the controller 712 can detect a collision during a beamforming training transmission, and in response to receiving a signal from a PCP, such as a polling signal or BFTT scheduling/allocation signal, cause the transceiver 708 to retransmit a beamforming training sequence or continue with beam refinement. If the PCP sends a BFTT scheduling/allocation signal, the controller 712 can determine a timeslot in which to transmit the beamforming training sequence based on the BFTT scheduling/allocation signal.

Further, if the device 700 is acting as a PCP, the controller 712 can set a limit on the duration of a timeslot that is used for beamforming training with unbeamformed stations. The controller 712 can include an indication of this limit in a beacon data unit or a beamforming training data unit, for example. In one implementation, the controller 712 can include an A-BFT IE in a beacon data unit and/or an A-BFT data unit, and the A-BFT IE can include one or more of an indication of a duration of the A-BFT timeslot, a field (e.g., SLIMIT) to indicate an upper limit (e.g., 4, 8, 16, 32, 64, etc.) to a number of transmit beamforming sector sweep data units that can be transmitted by a station to the PCP, a new station MAC address or simplified MAC address, etc.

If the device 700 is acting as a station already beamformed with a PCP, the controller 712 can examine an IE, such as an A-BFT IE, sent by the PCP to determine a duration of timeslot that is used for beamforming training with unbeamformed stations. The controller 712 can use the duration information to cause the device 700 to go into a low-power mode during the timeslot that is used for beamforming training with unbeamformed stations and to come out of the low-power mode at an appropriate time determined by the controller 712 based on the duration information.

Additionally, the controller 712 can control the transceiver 708 to transmit beamforming transmission signals in a randomized order with respect to direction as discussed above with respect to FIGS. 14A and 14B.

In one embodiment, a method comprises receiving a first beamforming training transmission corrupted by a collision, and determining a first station to which the first beamforming training transmission corresponds based on the first beamforming training transmission corrupted by the collision. The method also comprises in response to determining the first station, transmitting a signal to the first station to prompt the first station to transmit a second beamforming training transmission.

In other embodiments, the method may comprise one or more of the following. The method may comprise receiving a third beamforming training transmission corrupted by the collision, determining a second station to which the third beamforming training transmission corresponds based on the third beamforming training transmission corrupted by the collision, and transmitting a signal to the second station to prompt the second station to transmit a fourth beamforming training transmission in response to determining the second station.

Determining the first station may include recovering a source address from the first beamforming training transmission.

The method may comprise determining a time at which the first station should transmit the second beamforming training transmission in response to determining the first station, wherein the signal to the first station to prompt the first station to transmit the second beamforming training transmission includes an indicator of the time.

The time may be in a time period reserved for stations to perform beamforming training.

The first beamforming training transmission may be received by a central station during a first time frame in a plurality of time frames, wherein the central station may transmit beacons during respective beacon intervals in the plurality of time frames, and wherein the signal to the first station to prompt the first station to transmit the second beamforming training transmission may be transmitted during a beacon interval of a second time frame following the first time frame (e.g., in a subsequent A-BFT timeslot).

The first beamforming training transmission may be received by a central station during a first time frame in a plurality of time frames, and wherein the central station may transmit beacons during respective beacon intervals in the plurality of time frames. The signal to the first station to prompt the first station to transmit the second beamforming training transmission may be transmitted during the first time frame and outside of a beacon interval of the first time frame. For example, the signal can be transmitted during an AT timeslot with the format of a BFT grant/scheduling frame. In this case, the central station can poll the first station to redo BFT or continue BFT in a DTT timeslot of the first time frame. In another example, the central station may poll the first station during the A-BFT of the first time frame (e.g., in which the collision occurred) and request the station to redo BFT.

In another embodiment, an apparatus comprises a transceiver coupled to a plurality of antennas. The apparatus also comprises a controller configured to determine a first station to which a first beamforming training transmission corresponds based on the first beamforming training transmission, wherein the first beamforming training transmission is corrupted by a collision. The controller is also configured to cause the transceiver to transmit a signal to the first station to prompt the first station to transmit a second beamforming training transmission in response to determining the first station.

In other embodiments, the apparatus may comprise one or more of the following. The controller may be configured to determine a second station to which a third beamforming training transmission corresponds based on third first beamforming training transmission, wherein the third beamforming training transmission is corrupted by the collision, and cause the transceiver to transmit a signal to the second station to prompt the second station to transmit a fourth beamforming training transmission in response to determining the second station.

The controller may be configured to determine a time at which the first station should transmit the second beamforming training transmission in response to determining the first station, wherein the signal to the first station to prompt the first station to transmit the second beamforming training transmission includes an indicator of the time.

The time may be in a time period reserved for stations considered to be new to a network. The time may be in a time period reserved for stations considered to be already known to a network.

The first beamforming training transmission may be received during a first time frame in a plurality of time frames, and wherein the controller may cause the transceiver to transmit beacons during respective beacon intervals in the plurality of time frames. Additionally, the controller may cause the transceiver to transmit, during a beacon interval of a second time frame following the first time frame, the signal to the first station to prompt the first station to transmit the second beamforming training transmission.

The first beamforming training transmission may be received during a first time frame in a plurality of time frames, and the controller may cause the transceiver to transmit beacons during respective beacon intervals in the plurality of time frames. Additionally, the controller may cause the transceiver to transmit, during the first time frame and outside of a beacon interval of the first time frame, the signal to the first station to prompt the first station to transmit the second beamforming training transmission.

In another embodiment, a method comprises determining a plurality of directions in which to transmit beamforming training data units, and determining a randomized order with respect to the plurality of directions. The method also comprises transmitting the plurality of beamforming training data units in the plurality of directions in the randomized order.

In other embodiments, the method may comprise one or more of the following. Determining the randomized order may comprise determining a randomized order of a subset of the plurality of directions, and determining an order of remaining directions in the plurality of directions deterministically.

Determining the randomized order may comprise determining directions of odd numbered transmissions randomly or pseudo randomly, and determining directions of even numbered transmissions to be one hundred and eighty degrees from the previous odd-numbered transmission.

Determining the randomized order may comprise determining a direction of a first transmission randomly or pseudo randomly, and determining subsequent directions deterministically with respect to the first direction.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. A method comprising:
generating, at a communication device, a plurality of beacon data units, wherein each beacon data unit in the plurality of beacon data units includes an indication that the beacon data unit can be used for transmit beamforming training;
transmitting, by the communication device, the plurality of beacon data units via a plurality of antennas during a timeslot reserved for transmission of beacons, wherein transmitting the plurality of beacon data units includes applying a different beamforming vector to a beamforming network as each beacon data unit is transmitted;

receiving, at the communication device, an indication from a station that transmit beamforming training data units should not be transmitted to the station; and in response to receiving the indication from the station, skipping, at the communication device, a transmit beamforming training sequence with the station.

2. The method according to claim 1, wherein the indication that the beacon data unit can be used for transmit beamforming training comprises an information element that includes a number of beam refinement training sequences.

3. The method according to claim 2, wherein the information element includes an indication of a limit to a number of beamforming training data units that can be sent in a reverse direction.

4. The method according to claim 1, wherein the indication that the beacon data unit can be used for transmit beamforming training comprises a respective value indicating a position of a respective beamforming training data unit in a sequence of the plurality of beamforming training data units or a number of beamforming training units in the plurality of beamforming data units to follow the respective beamforming training data unit.

5. The method according to claim 1, wherein the indication that the beacon data unit can be used for transmit beamforming training comprises a field to indicate a request for beamforming training feedback.

6. The method according to claim 1, wherein the indication that the beacon data unit can be used for transmit beamforming training comprises a field having one or more subsequent beam refinement parameters.

7. The method according to claim 1, wherein the indication that the beacon data unit can be used for transmit beamforming training comprises a field indicating a limit to a number of transmit or receive beamforming training data units that can be sent in a reverse direction.

8. The method according to claim 1, wherein the indication from the station that transmit beamforming training data units should not be transmitted is received in a timeslot reserved for beamforming training with stations not yet beamformed.

9. An apparatus, comprising:
a transceiver coupled to a plurality of antennas, the transceiver including a beamforming network; and
a controller configured to
generate a plurality of beacon data units, wherein each beacon data unit in the plurality of beacon data units includes an indication that the beacon data unit can be used for transmit beamforming training,
cause the transceiver to transmit the plurality of beacon data units via the plurality of antennas during a timeslot reserved for transmission of beacons,
cause a different beamforming vector to be applied to the beamforming network as each beacon data unit is transmitted, and
in response to receiving an indication from a station that transmit beamforming training data units should not be transmitted to the station, skip a transmit beamforming training sequence with the station.

10. The apparatus according to claim 9, wherein the indication that the beacon data unit can be used for transmit beamforming training comprises an information element that includes a number of beam refinement training sequences.

11. The apparatus according to claim 10, wherein the information element includes an indication of a limit to a number of beamforming training data units that can be sent in a reverse direction.

12. The method according to claim 9, wherein the indication from the station that transmit beamforming training data units should not be transmitted is received in a timeslot reserved for beamforming training with stations not yet beamformed.

13. A method comprising:
receiving at a station a plurality of transmit beamforming training data units (i) transmitted by a first network controller during a timeslot reserved for transmission of beacons or (ii) transmitted by the first network controller to another station, wherein
the plurality of transmit beamforming training data units are beacon data units,
each of the beacon data units includes an indication that the beacon data unit can be used for transmit beamforming training, and
the indication that the beacon data unit can be used for transmit beamforming training comprises an information element that includes (i) a number of beam refinement training sequences and (ii) an indication of a limit to a number of beamforming training data units that can be sent to the first network controller; and
in response to receiving the plurality of transmit beamforming training data units, transmitting to the first network controller an indication that transmit beamforming training data units should not be transmitted to the station, wherein the indication that transmit beamforming training data units should not be transmitted to the station is transmitted in a timeslot reserved for beamforming training with stations not yet beamformed.

14. An apparatus, comprising:
a transceiver; and
a controller configured to
detect a plurality of transmit beamforming training data units (i) transmitted by a first network controller during a timeslot reserved for transmission of beacons or (ii) transmitted by the first network controller to another station separate from the apparatus, wherein
the plurality of transmit beamforming training data units are beacon data units,
each of the beacon data units includes an indication that the beacon data unit can be used for transmit beamforming training, and
the indication that the beacon data unit can be used for transmit beamforming training comprises an information element that includes (i) a number of beam refinement training sequences and (ii) an indication of a limit to a number of beamforming training data units that can be sent to the first network controller, and
in response to receiving the plurality of transmit beamforming training data units, cause the transceiver to transmit to the first network controller an indication that transmit beamforming training data units should not be transmitted to the apparatus, wherein the indication that transmit beamforming training data units should not be transmitted to the apparatus is transmitted in a timeslot reserved for beamforming training with stations not yet beamformed.

15. The apparatus according to claim 14, wherein the transceiver is coupled to a plurality of antennas;
wherein the transceiver comprises a beamforming network;
wherein the controller is configured to generate an additional plurality of beamforming training data units; and wherein the controller is configured to cause the transceiver to transmit the additional plurality of beamforming training data units to the first network controller via the plurality of antennas;

wherein the controller is configured to cause a different beamforming vector to be applied to the beamforming network as each beamforming data unit in the additional plurality of beamforming training data units is transmitted.

\* \* \* \* \*